US011723481B2

(12) United States Patent
DeRosa et al.

(10) Patent No.: US 11,723,481 B2
(45) Date of Patent: Aug. 15, 2023

(54) ONDO SELF-SERVE FOOD LOCKER SYSTEM

(71) Applicants: George DeRosa, Medford, NJ (US); Paul J. Gavin, Medford, NJ (US)

(72) Inventors: George DeRosa, Medford, NJ (US); Paul J. Gavin, Medford, NJ (US)

( * ) Notice: Subject to any disclaimer, the term of this patent is extended or adjusted under 35 U.S.C. 154(b) by 183 days.

(21) Appl. No.: 17/447,549

(22) Filed: Sep. 13, 2021

(65) Prior Publication Data
US 2021/0401193 A1 Dec. 30, 2021

Related U.S. Application Data

(63) Continuation of application No. 17/166,963, filed on Feb. 3, 2021, now Pat. No. 11,116,335.

(60) Provisional application No. 62/970,012, filed on Feb. 4, 2020.

(51) Int. Cl.
| | |
|---|---|
| *G06F 7/00* | (2006.01) |
| *A47F 10/06* | (2006.01) |
| *G06Q 10/0836* | (2023.01) |
| *G05B 15/02* | (2006.01) |
| *A47F 3/00* | (2006.01) |

(52) U.S. Cl.
CPC .............. *A47F 10/06* (2013.01); *A47F 3/001* (2013.01); *G05B 15/02* (2013.01); *G06Q 10/0836* (2013.01)

(58) Field of Classification Search
CPC ......... A47F 10/06; A47F 3/001; G05B 15/02; G06Q 10/0836; G06Q 20/18; G06Q 20/3223; G06Q 20/326; G06Q 20/3274; G06Q 20/4012; G06Q 20/40145; G07F 9/001; G07F 9/105; G07F 17/12; G07F 17/0078
USPC ................ 700/213–216, 220–221, 228, 300
See application file for complete search history.

(56) References Cited

U.S. PATENT DOCUMENTS

| | | | |
|---|---|---|---|
| 2019/0156086 A1* | 5/2019 | Plummer | .............. H04N 23/80 |
| 2019/0304238 A1 | 10/2019 | Ambauen et al. | |
| 2020/0184437 A1* | 6/2020 | Kelly | ................. G07F 17/0064 |

* cited by examiner

Primary Examiner — Yolanda R Cumbess
(74) Attorney, Agent, or Firm — Charles L. Thoeming

(57) ABSTRACT

Embodiments of the disclosure are directed to a touchless automatic food locker apparatus, system, and method providing automated self-serve food lockers. Embodiments include arrays of modular food lockers having a public access door and a kitchen access door opposed to each other, assembled as a wall between the public space and the kitchen. Each food locker kitchen access door is adapted to receive a food item disposed into the locker. Heating and cooling elements maintain the appropriate food item temperature in the locker. Sensors, lighting, and UV lighting coupled to the locker detects a state of the item in the locker. The locker further includes credentialed access by the customer to the food locker from the public access door by an assembly coupled to the food locker utilizing mobile communication and intelligent analysis to reduce waiting time, keep food products fresh, and assure quality product delivery.

8 Claims, 24 Drawing Sheets

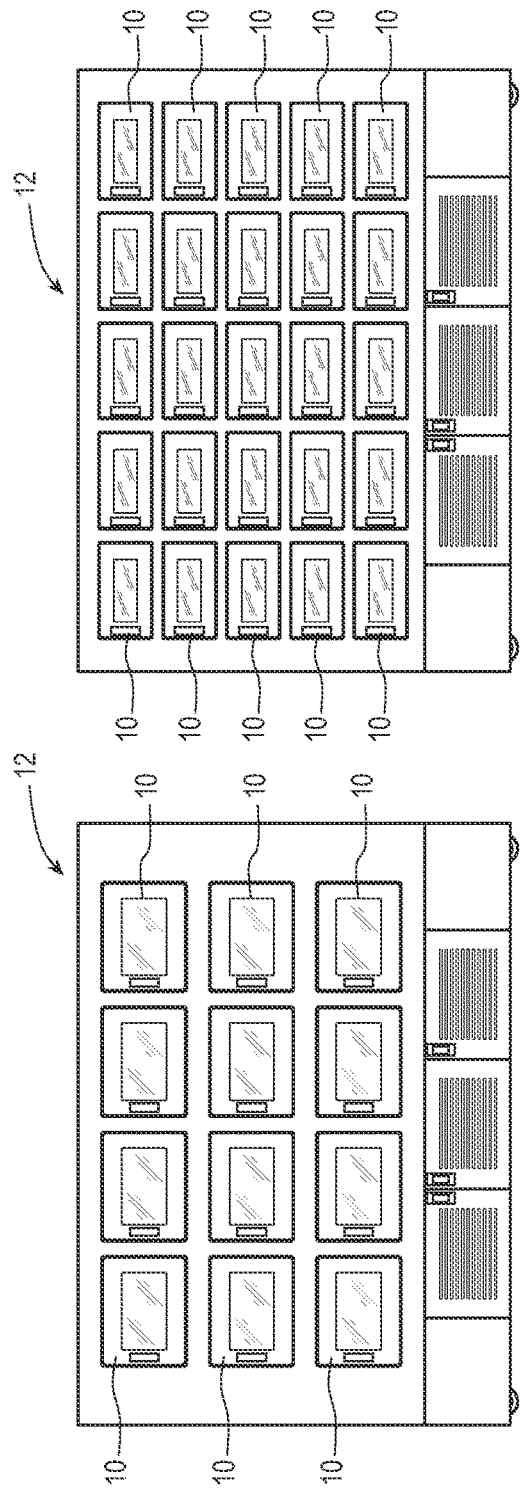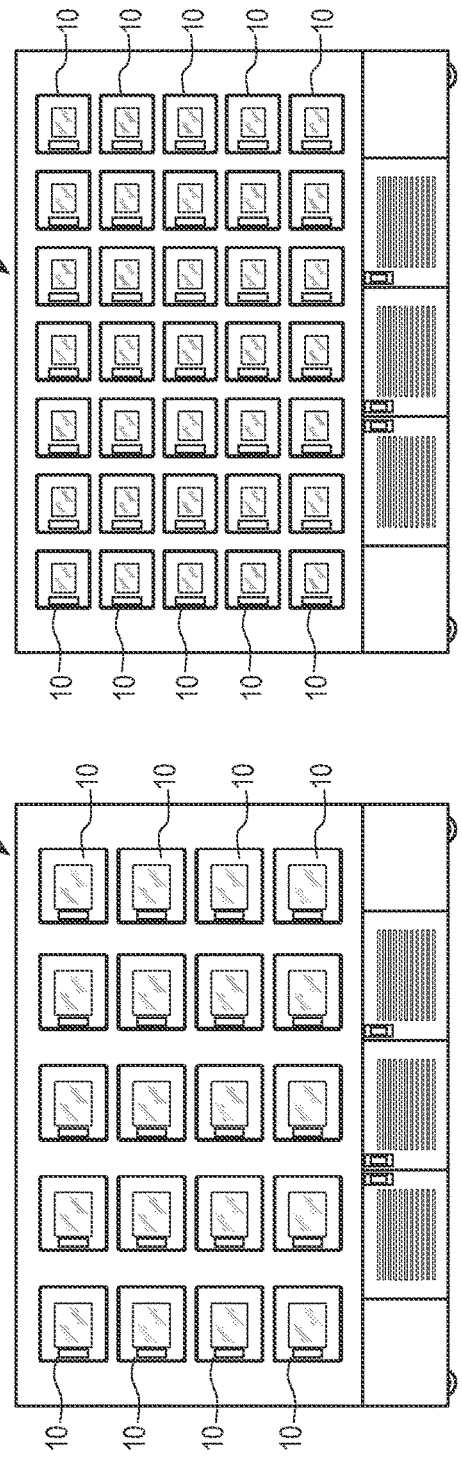
FIG. 6A   FIG. 6B   FIG. 6C   FIG. 6D

ONDO SELF-SERVE FOOD LOCKER SYSTEM

CROSS-REFERENCE TO RELATED APPLICATIONS

This application claims the benefit of priority from U.S. Provisional Application No. 62/970,012, filed Feb. 4, 2020, the entirety of which is incorporated herein by reference, and U.S. Non-provisional application Ser. No. 17/166,963, filed Feb. 3, 2021, now U.S. Pat. No. 11,116,33 schedule to issue on Sep. 14, 2021.

TECHNICAL FIELD

The present disclosure relates to self-serve food locker assemblies, systems, and methods. More particularly, this disclosure includes automated self-serve food locker assemblies, systems, and methods providing touchless operation of pass-through food lockers.

BACKGROUND

As consumers demand more diverse food options without sacrificing quality and convenience, restaurants and fast-casual brands are seeking innovative ways to provide a unique and positive customer experience. Many brands emphasize speed and ease of ordering by offering to-go menus and the ability to order food online. When managed effectively, this minimizes the wait time for customers while providing the restaurant with an additional revenue stream. However, unique challenges are presented when attempting to create a seamless takeout ordering experience.

A typical restaurant relies on the availability of staff members for handling customer to go orders. In a busy restaurant setting, this can be a stressful and time-consuming ordeal for both the customer and the restaurant. Mix-ups and unnecessarily long wait times are not uncommon. Human labor is one of the highest operational costs for restaurants; however, people are becoming unnecessary, and even detrimental in many scenarios, such as handling of take-out orders.

Another challenge associated restaurants face in providing takeout is combating heat gain or loss in the food while awaiting pickup. Takeout orders are often placed in paper or plastic bags, which do little to prevent heat gain or loss during storage. Receiving food too hot or cold often frustrates consumers can damage a restaurant's reputation. In addition, perishable foods cause safety concerns when mishandled. The USDA recommends that once food is cooked, it should be stored at 140 degrees Fahrenheit (60 degrees Celsius) or above, and cold foods should be stored at 40 degrees Fahrenheit (4.44 degrees Celsius) or below until consumed. For takeout foods, it is recommended that perishable foods should not be kept between 40 degrees Fahrenheit (4.44 degrees Celsius) and 140 degrees Fahrenheit (60 degrees Celsius) for over two hours.

The Covid-19 pandemic heightened the need for takeout food delivery improvements within new health safety protocols. Minimizing human touching of prepared takeout food containers and delivery compartments is a demonstrable factor in limiting global bacteriological and viral contaminations.

There is a need for food locker assemblies, systems, and methods that provide: 1) automated control of food locker access for loading and unloading the locker; 2) touchless pass-through food compartments for active food modular locker arrays between a kitchen environment and a public space; 3) ultra-violet sterilizing lights in germ food lockers; 4) separate hot-cold lockers with integrated timed heating/cooling temperature control; 5) food compartment doors with integrated human machine interface (HMI) control screens; and 6) linear drive hardware on touchless food compartment motorized doors.

SUMMARY

The disclosure details a unique steel cabinetry series that leverages today's technology to eliminate the common challenges involved in takeout ordering. The to go ONDO™ Self-serve Food Locker assembly, system, and method with hot and cold food storage capability provides a convenient automated self-service ordering platform for a virtually enhanced dining experience. Not only does the system benefit consumers by allowing them to skip the lines and retrieve their orders directly, but it also reduces the restaurant's operational costs by eliminating the need for additional staff. Through automating the ordering process and eliminating unnecessary staff intervention, restaurants can reduce congestion in waiting areas as multiple customers are served simultaneously. The customer will experience streamlined service with assurance they are receiving their food at a safe temperature and from a bacteria and virus free storage environment.

The principal components of the ONDO™ Self-serve Food Locker assembly, system, and method are food locker doors with an integrated Human User Machine Interface, (HMI) or User Interface (UI), which serve as a customer interface. The doors are housed in cabinetry and provide pass-through access using automated flip-up food locker doors or conventional opening food locker doors for easy order retrieval. Integrated heating and/or refrigeration system control food locker internal temperature for preserving the customer's order. The ONDO™ Self-serve Food Locker assembly, system, and method provide a "modular," energy efficient insulated system utilizing parallel stacking of self-contained towers for expansion as befits venue or facility space availability.

Once the customer places an order via smartphone or through a touch-screen kiosk in the restaurant, they will be prompted for payment, which can be done at the kiosk or via smartphone for mobile orders. Once payment is received, the prepared food is placed in an ONDO™ food locker and the kiosk or mobile application notifies the customer that their order is ready for pickup. The notification indicates the food locker number where the order is placed and a reminder it must be picked up within a predetermined time frame. The customer has this window of time to retrieve their food from the food locker before the food is removed and discarded by restaurant staff. The food locker's HMI/UI screen displays the locker number, the customer's first name or other customer provided data for easy identification. In addition, the countdown from the predetermined pickup time window is displayed. Once the customer finds the correct locker, he or she is prompted to press an on-screen button for input of a PIN number or a bar code or quick response (QR) code to open the food locker. This customer input prompts the automated food locker doors to open, allowing food retrieval. An integrated occupancy sensor will sense when the food has been collected and will automatically close the door.

The ONDO™ Self-serve Food Locker assembly, system, and method also incorporate monitor screens for both the food service attendant(s) and kitchen staff. This capability provides monitoring each order's queue and status.

BRIEF DESCRIPTION OF THE DRAWINGS

Various embodiments are depicted in the drawings for illustrative purposes and should in no way be interpreted as limiting the embodiments. In addition, various features of different disclosed embodiments can be combined to form additional embodiments, which are part of this disclosure.

FIG. 6A is a front elevational view of an embodiment of an ONDO™ Self-serve Food Locker assembly for a 4×3 array of 12-inch by 16-inch (30.48 cm by 40.64 cm) modular food lockers in a 96-inch (2438.4 mm) bay.

FIG. 6B is a front elevational view of an embodiment of an ONDO™ Self-serve Food Locker assembly for a 5×4 array of 12-inch by 12-inch (30.48 cm by 30.48 cm) modular food lockers in a 96-inch (2438.4 mm) bay.

FIG. 6C is a front elevational view of an embodiment of an ONDO™ Self-serve Food Locker assembly for a 5×5 array of 8-inch by 12-inch (20.32 cm by 30.48 cm) modular food lockers array in a 96-inch (2438.4 mm) bay.

FIG. 6D is a front elevational view of an embodiment of an ONDO™ Self-serve Food Locker assembly for a 7×5 array of 8-inch by 8-inch (20.32 cm by 20.32 cm) modular food lockers in a 96-inch (2438.4 mm) bay.

FIG. 22A taken at "23-23."

DETAILED DESCRIPTION OF CERTAIN EMBODIMENTS

Embodiment of the ONDO™ Self-serve Food Locker assembly, system, and method are disclosed in FIGS. 1-24.

Figure 1:
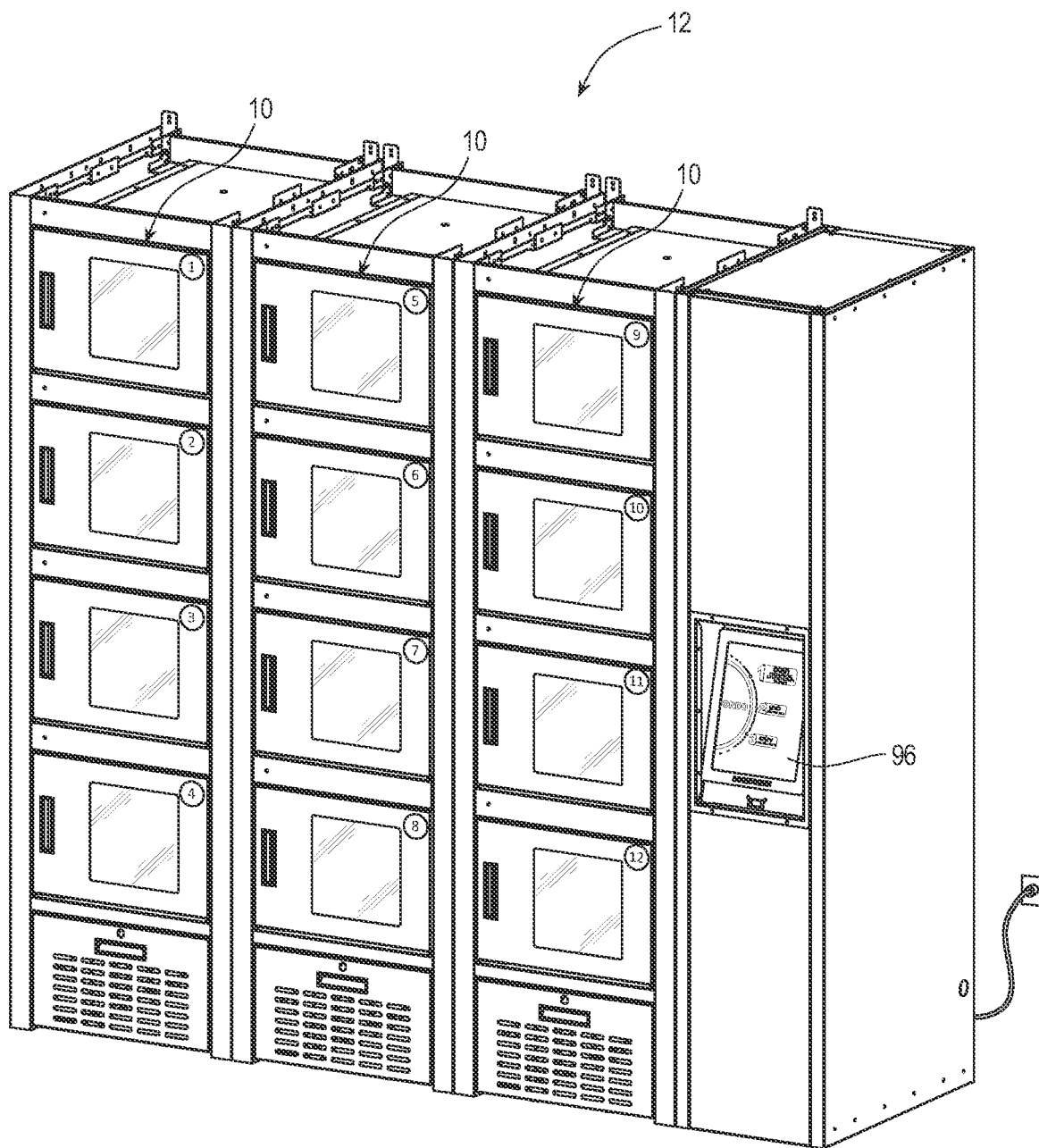
FIG. 1 is a top right front perspective view of a modular 3×4 array for an embodiment of the ONDO™ Self-serve Food Locker assembly.
Figure 2:
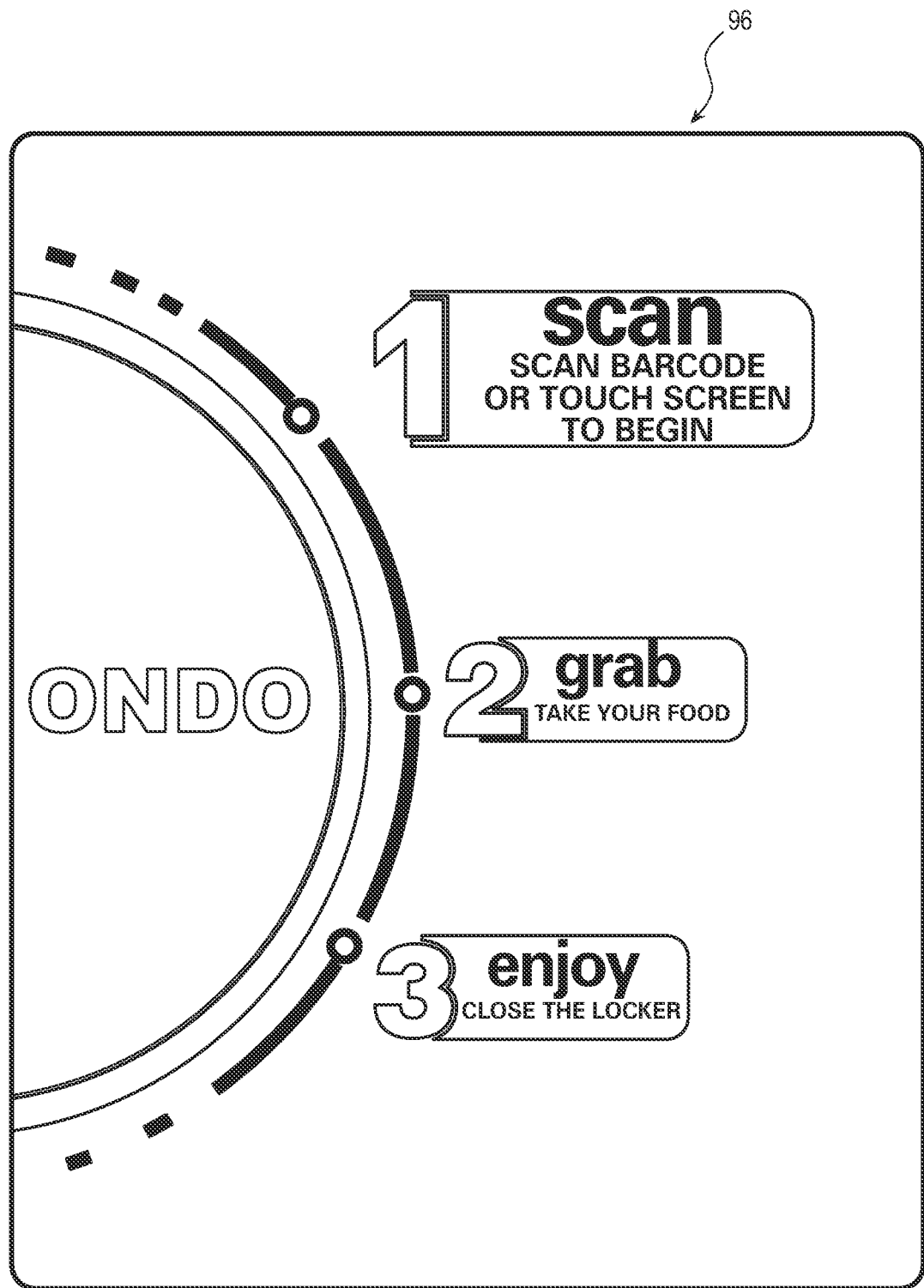
FIG. 2 is a representative interactive human-machine interface screen for an embodiment of the ONDO™ Self-serve Food Locker assembly.
Figure 3A:
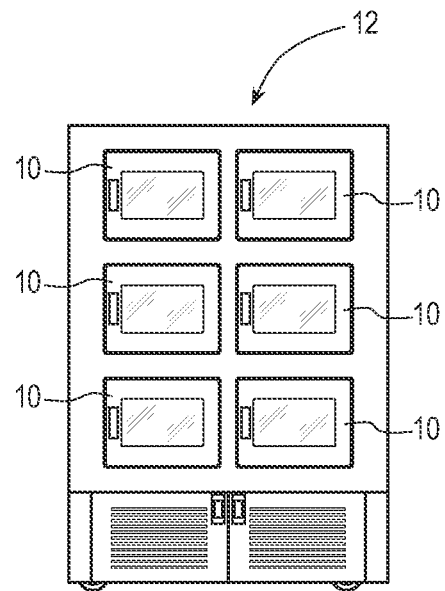
FIG. 3A is a front elevational view of an embodiment of an ONDO™ Self-serve Food Locker assembly for a 2×3 array of 12-inch by 16-inch (30.48 cm by 40.64 cm) modular food lockers in a 48-inch (1219.2 mm) bay.
Figure 3B:
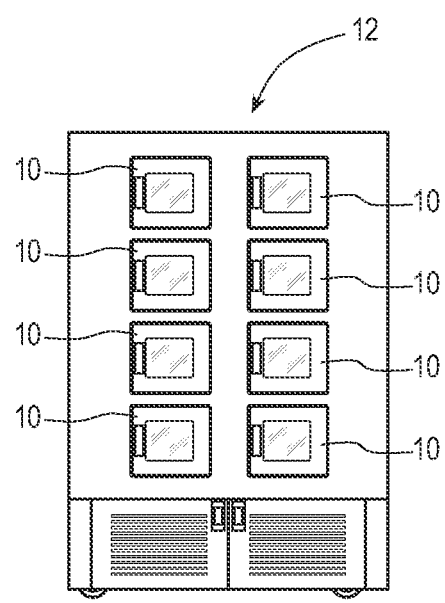
FIG. 3B is a front elevational view of an embodiment of an ONDO™ Self-serve Food Locker assembly for a 2×4 array of 12-inch by 12-inch (30.48 cm by 30.48 cm) modular food lockers in a 48-inch (1219.2 mm) bay.
Figure 3C:
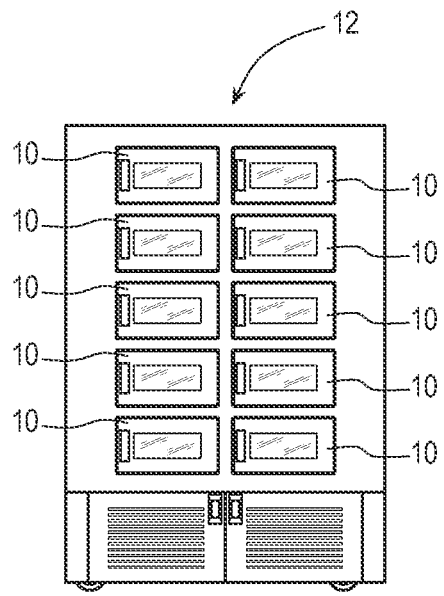
FIG. 3C is a front elevational view of an embodiment of an ONDO™ Self-serve Food Locker assembly for a 2×5 array of 8-inch by 12-inch (20.32 cm by 30.48 cm) modular food lockers in a 48-inch (1219.2 mm) bay.
Figure 3D:
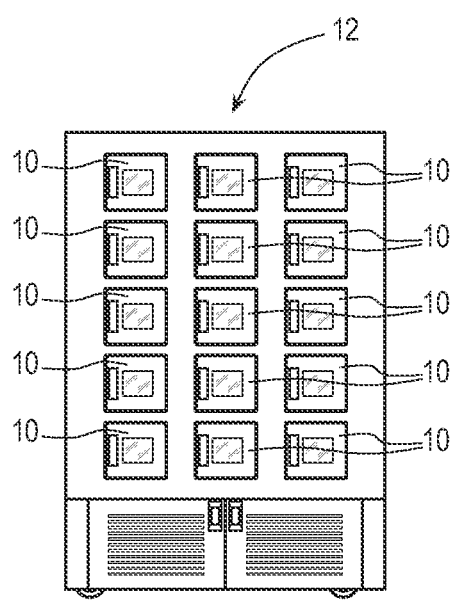
FIG. 3D is a front elevational view of an embodiment of an ONDO™ Self-serve Food Locker assembly for a 3×5 array of 8-inch by 8-inch (20.32 cm by 20.32 cm) modular food lockers in a 48-inch (1219.2 mm) bay.
Figure 4A:
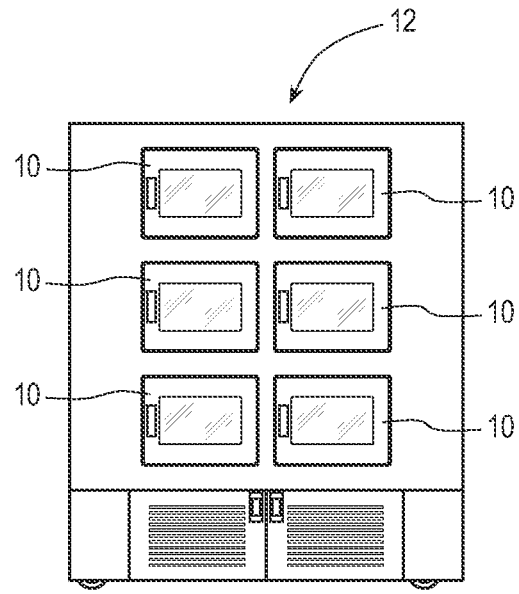
FIG. 4A is a front elevational view of an embodiment of an ONDO™ Self-serve Food Locker assembly for a 2×3 of 12-inch by 16-inch (30.48 cm by 40.64 cm) modular food lockers in a 60-inch (1524 mm) bay.
Figure 4C:
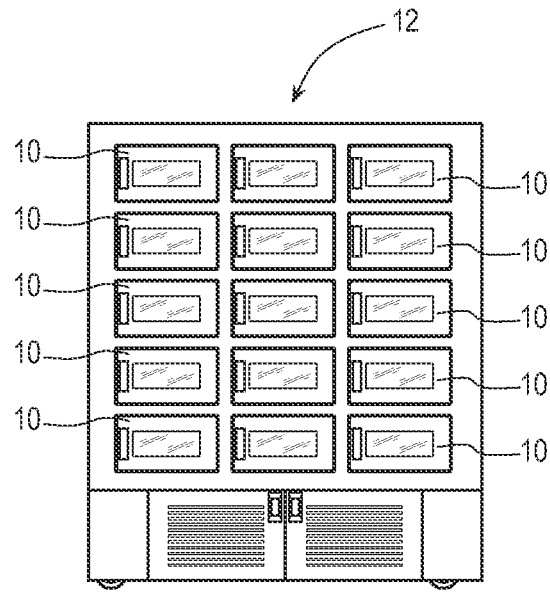
FIG. 4C is a front elevational view of an embodiment of an ONDO™ Self-serve Food Locker assembly for a 3×5 array of 8-inch by 12-inch (20.32 cm by 30.48 cm) modular food lockers in a 60-inch (1524 mm) bay.
Figure 4B:
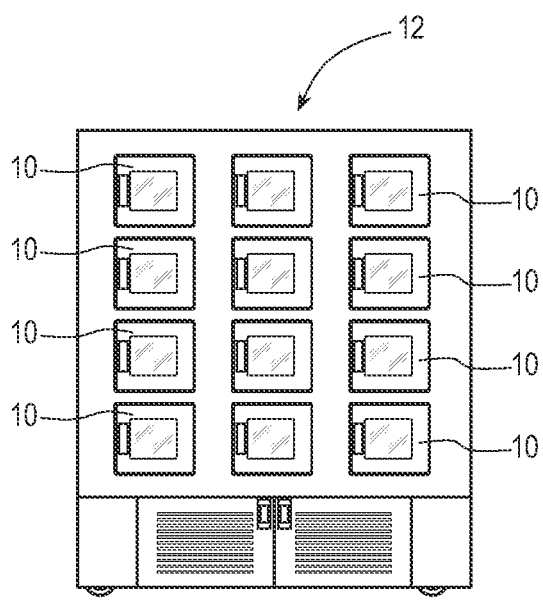
FIG. 4B is a front elevational view of an embodiment of an ONDO™ Self-serve Food Locker assembly for a 3×4 array of 12-inch by 12-inch (30.48 cm by 30.48 cm) modular food lockers in a 60-inch (1524 mm) bay.
Figure 4D:
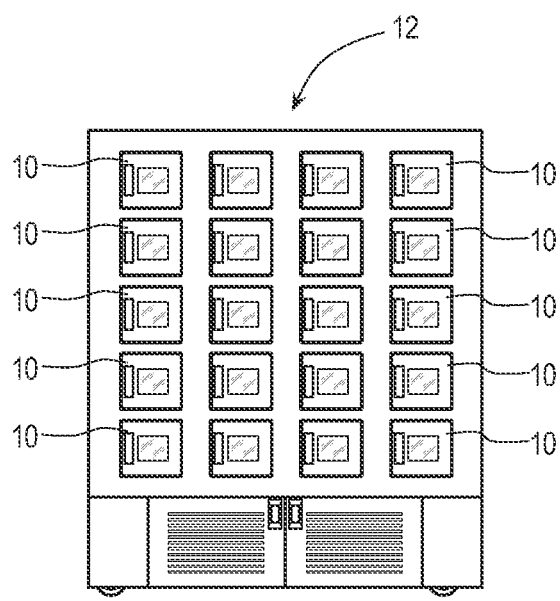
FIG. 4D is a front elevational view of an embodiment of an ONDO™ Self-serve Food Locker assembly for a 4×5 array of 8-inch by 8-inch (20.32 cm by 20.32 cm) modular food lockers in a 60-inch (1524 mm) bay.
Figure 5A:
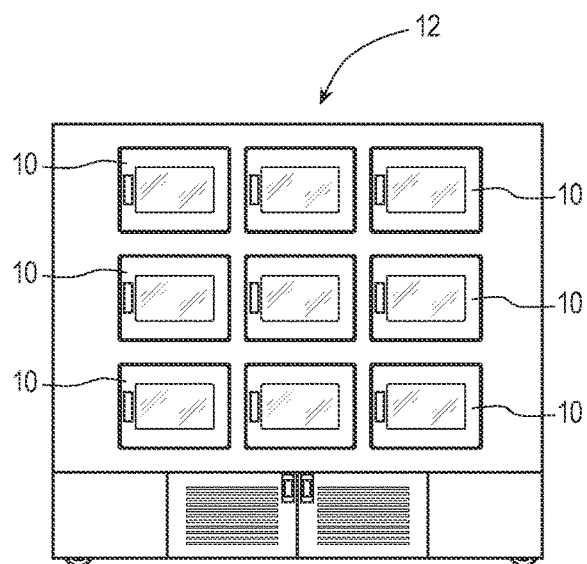
FIG. 5A is a front elevational view of an embodiment of an ONDO™ Self-serve Food Locker assembly for a 3×3 array of 12-inch by 16-inch (30.48 cm by 40.64 cm) modular food lockers in a 78-inch (1981.2 mm) bay.
Figure 5C:
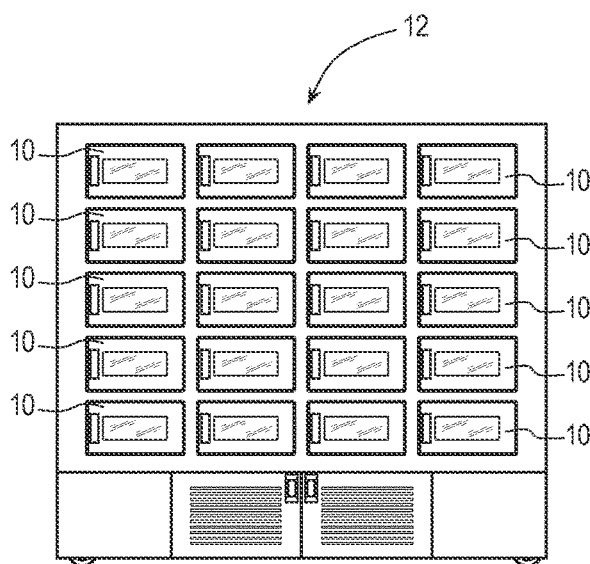
FIG. 5C is a front elevational view of an embodiment of an ONDO™ Self-serve Food Locker assembly for a 4×5 array of 8-inch by 12-inch (20.32 cm by 30.48 cm) modular food lockers in a 78-inch (1981.2 mm) bay.
Figure 5B:
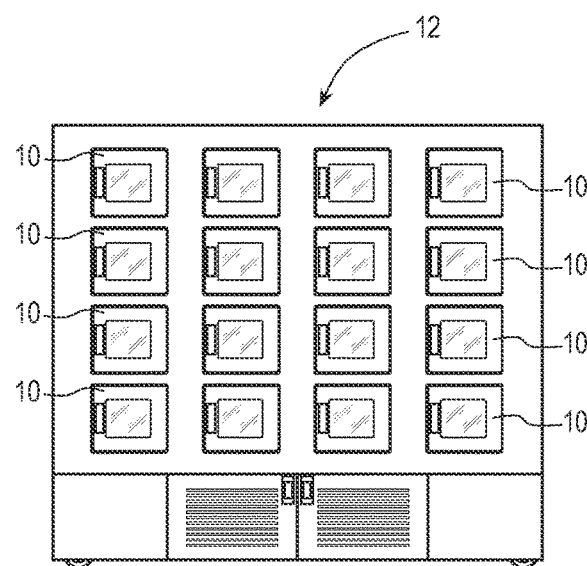
FIG. 5B is a front elevational view of an embodiment of an ONDO™ Self-serve Food Locker assembly for a 4×4 array of 12-inch by 12-inch (30.48 cm by 30.48 cm) modular food lockers in a 78-inch (1981.2 mm) bay.
Figure 5D:
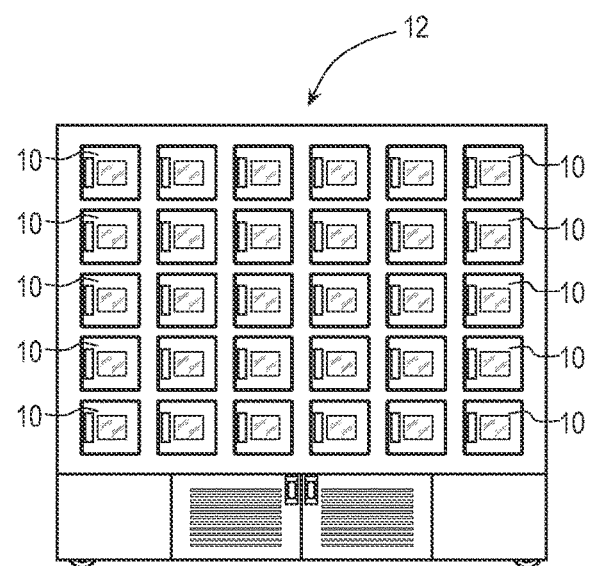
FIG. 5D is a front elevational view of an embodiment of an ONDO™ Self-serve Food Locker assembly for a 6×5 array of 8-inch by 8-inch (20.32 cm by 20.32 cm) modular food lockers in a 78-inch (1981.2 mm) bay.

FIG. 1 depicts a representative 3×4 array of modular automatic pass-through self-serve locker assembly 12 for an embodiment of the ONDO™ Self-serve Food Locker assembly, system, and method. The main cabinet houses twelve individual modular automatic pass-through self-serve food lockers 10 with internal dimensions of 12"×12"×19" (30.48 cm×30.48 cm×48.26 cm). Each food locker 10 is configured for hot or cold food item storage. Multiple modular arrays 12, size permutations, and combinations of the disclosed food lockers 10 for variants are in depicted in FIGS. 3A-6D. Food service staff can toggle between heating and refrigeration according to the food being prepared. Each individual food locker can be configured for heating or cooling with the flip of a switch. Customer and administrative access to the food locker ordering, retrieval and other delivery for some variants is managed through an integral or remote touch screen 96, FIGS. 1, 2, 19A and 19B. Operational control of the food locker, including the temperature is managed through key board or touch screen input, FIGS. 11A, 11B, and 13, to a digital processor 206, a memory module 196 coupled to the digital processor 206, a network interface comprising wireless Wi-Fi® connectivity 194 or ethernet connectivity 296 and coupled to the digital processor 206, and software, via a web portal, mobile applications, or on-site digital control station FIGS. 7-24. Through this combined technology, a variety of functions can be implemented to manage the food lockers, see step 318, FIG. 8. These functions include managing temperature control, such as automatic temperature conversions based on time of day, via temperature readings from embedded probes (if the temperature reaches a rating out of the threshold, the compressor or heating pad will automatically energize to bring that temperature back to the desired rating), or via a queuing system (an algorithm that dynamically assesses the state of all lockers and orders to automatically convert temperatures in real time, as needed). The digital processor 206 for various embodiments of the ONDO™ Self-serve Food Locker recognizes orders and assess locker availability based on temperatures and the required temperature for an order, step 318, FIG. 8. If there are no available lockers for the needed temperature, the digital processor 206 automatically converts a vacant locker to the desired temperature while the kitchen is preparing the meal, step 316, FIG. 8.

Figure 7:
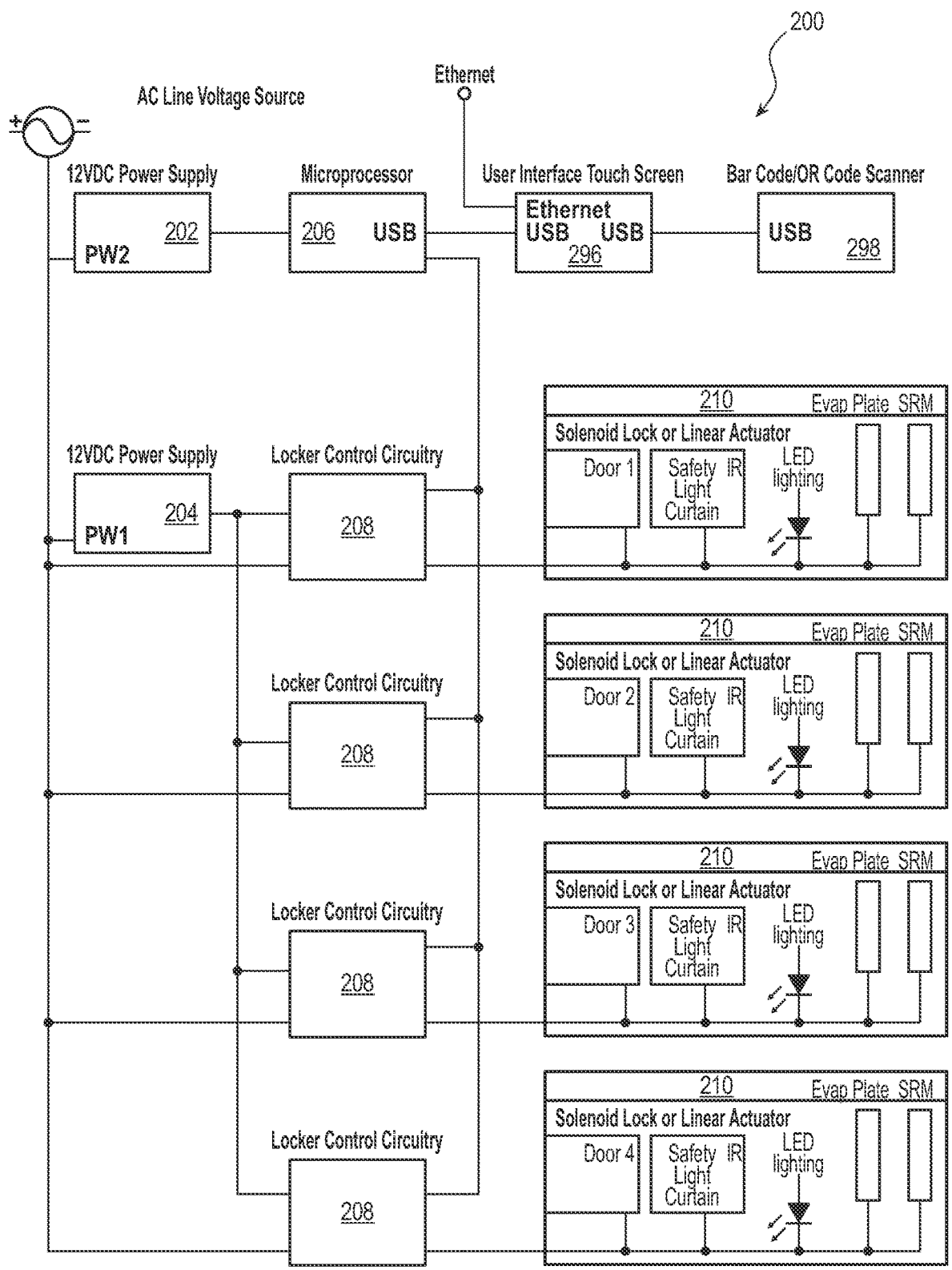
FIG. 7 is a representative schematic 200 for the electrical system for embodiments of the ONDO™ Self-serve Food Locker assembly, system, and method.

Embodiments of the ONDO™ Self-serve Food Locker assembly, system, and method provide electrical connectivity as depicted generally in the representative electrical schematic diagram 200, FIG. 7. 12 VDC power supplies 202 and 204 provide electrical power to the microprocessor 206, user interface touch screen 296, bar code or quick response code scanner(s) 298, and locker control circuitry 208 for the solenoid lock, linear actuator, LED lighting, evaporative plate, and service resource module(s) of the food locker 210.

Embodiments of the ONDO™ Self-serve Food Locker assembly, system, and method of the layout can apply to individual food lockers, modular arrays of food lockers, or the entire modular array wall of food lockers, FIGS. 3A-6D. For example, if a wall has 3 columns of 4 lockers, FIG. 3D, the system operator can set columns 1 and 2 to hot, and column 3 to cold (cluster method). Likewise, the system operator could set the first 2 boxes in column 1 to hot, the bottom 2 boxes in column 1 to cold, and the remaining 2 columns to ambient (combination of individual and cluster). This locker management step 318 can be set up in the system for any combination or number of modular arrays of food lockers, FIG. 8.

Embodiments of the ONDO™ Self-serve Food Locker assembly, system, and method provide multiple-size, dual-zone food lockers where two lockers are set adjacent with an insulated divider separating them. These dual-zone lockers share one forward and one rear door which would both unlock for placement into and retrieval from the lockers. This gives system operators the option to offer multiple meals for one order. For example, if a soda and hamburger were ordered, one locker would be set to hot and the other to cold; if after that, someone orders four hamburgers, the system operator could set both lockers to hot, to place two hamburgers in one locker and two hamburgers in the other. This flexibility for various orders with multiple foods selected highlights the novel utility of the ONDO™ Self-serve Food Locker assembly, system, and method. This utility offers the flexibility to accommodate for additional space during peak periods. Both dual-zone lockers need not be filled. If the single-zone lockers are all occupied, and the system operator needs to place an additional order, they can simply use the dual-zone locker for a single item.

Embodiments of the ONDO™ Self-serve Food Locker assembly, system, and method provide lockers constructed of a food grade stainless-steel cabinet frame cored with flame retardant material. The locker interior is lined with 2400-degree Fahrenheit heat retardant thermal insulation. A thermal break 66 is installed at each door opening to limit condensation, FIGS. 16A-17B. Mounted on the lockers 10 are doors 65A and 65B comprised of dual paned insulated glass fixed within a composite frame. The locker doors 65A and 65B houses an LCD interactive human-machine interface screen to serve as a customer interface. The locker doors 65A and 65B are tempered insulated glass with UV blocking film 70 fixed within a composite frame for users to see the food, and internal LED lighting. The locker doors 65A and 65B can also be solid and may match the finish of the unit. For some embodiments of the ONDO™ Self-serve Food Locker assembly, system, and method, the front and rear locker doors, 65A and 65B, respectively, are mounted to the cabinet via a linear drive, allowing the doors to automatically open and close when prompted. Some embodiments of the ONDO™ Self-serve Food Locker assembly, system, and method provide traditional spring-loaded swing food locker doors without screens. Some embodiments of the ONDO™ Self-serve Food Locker assembly, system, and method provide manual rear doors mounted to the rear of the locker 10 the ONDO™ Self-serve Food Locker assembly, system, and method for loading prepared orders awaiting customer pickup, FIGS. 20-24. Food grade stainless steel left and right-side panels, 122 and 120 respectively, and base 124 house variants of modular food locker configurations, FIG. 24.

Embodiments of the ONDO™ Self-serve Food Locker assembly provide a safety light curtain sensor transmitter 40 and a safety light curtain sensor receiver 42 on opposite sides of a touchless linear drive food locker providing dual panel insulated glass with UV blocking film 70 and access to a food grade stainless steel food locker cavity 72, FIGS. 16A-17B. The touchless linear drive food locker is attached to and driven by a motorized linear actuator 48 affixed to a food locker external surface by an adjustable field serviceable linear actuator mounting assembly 58 and a linear actuator tension/compression assembly 56 with an electro-mechanical solenoid lock 50. The motorized linear actuator electronic control, driver, food compartment lighting, food compartment UV lighting, and access door safety interlock are all controlled by a front flag food locker chamber control module 44.

The food locker access door status is visibly displayed by an access door opening indicator lamp/LED 62. An automatic or manual (not depicted) food locker kitchen access door is controlled by RFID sensor or fingerprint sensor 62, FIGS. 16A-17B. An ultra-high-molecular-weight (UHMW) high-heat polyethylene thermal break 66 frames the access food locker door contact with the opening to the food locker cavity. Food locker interior lighting includes an ultra-violet (UVC) sanitizing module 88 and a light emitting diode (LED) module 82, FIG. 17B.

The kitchen access door driver, food compartment lighting, food compartment UV lighting, and access door safety interlock are controlled by a rear flag food locker chamber control module 46 and an electro-mechanical solenoid lock 50. A santoprene, dart-style high temperature polyvinyl chloride gasket 64 insulates the customer access door and kitchen access door to the food locker cavity. Heating the food locker cavity is achieved by a silicone rubber mat heating element with a heat diffuser/conductive aluminum plate 54.

Cooling the self-serve food locker cavity is achieved by a refrigerant line feed 76 from a food locker module centric compressor 108, a capillary tube refrigerant return line 78 to the compressor 108, and a coolant control solenoid valve 74, FIGS. 16A-17B, 23. The food locker cavity is insulated by 2 inches thickness of closed-cell polyiso-foam with embossed aluminum faces 68 enclosed between inner and outer food locker cavity shells 68. An external food locker top surface provides a wiring access point 60 for food locker cavity internal lighting. A main power source drawer 90, FIG. 18, with a Programable Logic Controller (PLC) supplies signal distribution for customer door access and power distribution for alternating current, direct current and emergency battery power for the system. The power source drawer 90 also has provisions for an on/off circuit breaker with an integrated power switch 92 and a switch position for chamber emergency access 94. Technology stations provide convenient housing for the User Interface Touch Screen PC. One version of technology stations consists of a food grade stainless steel or powder coated finish 100 towers 102, FIG. 19A. This version of technology stations can be attached to self-contained stackable food locker columns with independently controlled pass-through food lockers and mechanical/electrical access doors with integrated handles and security lock, i.e., FIGS. 1, 20-24. A variant version of technology station is a housing that can be hung or attached to a column or wall with a food grade stainless steel or powder coated finish 100, FIG. 19B. A typical food locker column tower consists of a locker assembly 12 as described in FIGS. 20-24 providing temperature-controlled food locker chambers, FIGS. 16A-17B, the main AC power source with programmable controller (digital processor 206, a memory module 196) network interface 19 within the DC power source drawer 90, the pressure controlled compressed gas refrigeration system 108, all contained within the tower. FIGS. 3A-6D, and 20-24 demonstrate several of the modular configurations for the embodiments of the ONDO™ Self-serve Food Locker assembly, system, and method components disclosed and described in FIGS. 16A-19.

Embodiments of the ONDO™ Self-serve Food Locker assembly, system, and method provide lockers in a variety of configurations to suit a wide range of food and beverage items.

Dry food lockers are provided for foods picked up within a brief period of time according to all food safety standards. This unit will incorporate a simple shelf base for storing food. Hot food lockers are provided for cooked foods served hot. The hot configuration includes an induction warmer within the food locker interior.

Cold food lockers are provided for preserving drinks, frozen foods, salads, or other foods served cold. The cold food locker configuration includes an evaporative plate that lines the food locker interior.

Hot and Cold Combination food lockers provide an interior partitioned into two sections. One section provides the silicone mat heater, and the other provides an evaporative plate lining for storing both hot and cold foods at the appropriate temperature. Hot and cold lockers are electronically controlled via digital control mechanisms and sensors. Individual lockers can be connected to heating or cooling via a time delay relay activated switch at the rear of the unit. Lockers storing hot food include a silicone rubber mat (SRM) heater 54, FIG. 16A, with adjustable heat settings for keeping food at an optimal temperature while awaiting pickup. The warmer also includes built-in safety features such as over-heat protection to mitigate burn and fire risks.

Glass Door with Integrated HMI LCD Screen

Food locker access doors are constructed of a glass panel mechanically fastened to a composite frame. Each food locker includes an integrated human machine interface (HMI) panel mounted to the door frame behind the glass. The HMI is programmed so graphics and textual information, such as food locker number and the first name and last initial of the customer are displayed on the screen. The HMI is linked to the kiosk within the restaurant, which is a platform for ordering and processing payments. The food ordering and payment program enables the customer to open the food locker door by pressing an on-screen door open button when prompted. After the food is removed, an integrated occupancy sensor signals the automated doors to close after a predetermined time.

Automated Flip-Up Doors

Embodiments of the ONDO™ Self-serve Food Locker assembly, system, and method provide an automated system activating linear drive hardware, which allows the food locker doors to automatically open when prompted by the customer. The automatic food locker doors allow for a streamlined and elegant, handle-less cabinet design. The sleek design simplifies cleaning while giving an aesthetically pleasing appearance. With this system, the food locker door silently glides up and out of the customer's way, which provides touchless, and unobstructed access to the particular modular food locker housed in the cabinet.

Automatic food locker door mounting hardware is mechanically fastened to the composite frame and the lift mechanisms are fastened on either side of the food locker's interior cavity FIGS. 16A-17B. Once the door mounting hardware is mounted to both the food locker door frame and the food locker interior, the food locker door is easily removed and swapped if needed without tools.

The linear drive hardware 48, 50, 56, and 58 to activate the automatic food locker doors are powered via a 12V power supply mounted in a field serviceable drawer in the bottom of the cabinet and external to each individual modular food locker in the array of food lockers in the cabinet, FIGS. 16A-18. The linear drive hardware connects a push button switch, so that the customer can close the food locker door with the push of an on-screen button. The food locker door can also be programmed via the HMI to close automatically after a predetermined time. The linear drive hardware 48, 50, 56, and 58 also establish a wired connection to a push button battery backup switch allowing the vendor to open the food locker should a power failure occur.

Integrated Refrigeration and Heating Systems

Hot and cold food lockers are electronically controlled via digital control mechanisms and sensors. Individual food lockers can be connected to heating or cooling via a time delay relay activated switch at the rear of the unit. Food lockers storing hot food contain a 110V silicone mat heater 54 with adjustable heat settings for keeping food at an optimal temperature while awaiting pickup FIGS. 16A-17B. The warmer also includes built-in safety features such as over-heat protection to mitigate burn and fire risks.

Variants include food lockers configured for cold food and beverage items, refrigerated with an evaporative plate lining the internal food locker cabinet space. Using an evaporative plate 80 allows for a compact, cleanable surface on the interior of the food locker 10. The evaporative plate 80 has an integrated supply and return for circulating refrigerant throughout its entire surface area. This supply and return will be piped to a compressor and evaporator, which can either be remote to the unit, or housed within the lower portion of the cabinet 104, FIG. 20. The evaporative plate 80 is a light weight, formable metal such as aluminum, formed to line the interior walls of the food locker.

Hot and Cold food lockers are partitioned to integrate both the silicone mat heater 54 and the evaporative plate 80 for storing hot and cold food items, respectively.

System Technology Overview

Embodiments of the ONDO™ Self-serve Food Locker assembly, system, and method provide a digital processor, a memory module coupled to the digital processor and a network interface comprising wireless connectivity and coupled to the digital processor. This local microprocessor assembly provides the system synchronization with cloud computing on a regular cadence and is resident in a power source drawer 90 inside (not shown) the technology tower station, FIG. 19A, or inside (not shown) the technology remote mounted station, FIG. 19B. Once an order is delivered, the local microprocessor assembly and system sends the information to the cloud, and cloud computing components, and the cloud computing system sends wireless 720 notification (email, SMS, etc.) to the customer's hand-held digital device 700, FIGS. 19A and 19B.

Embodiments of the ONDO™ Self-serve Food Locker assembly, system, and method provide a system using central controller to de-energize or energize specific magnetic locks based on food locker doors that need to be opened or closed. This central controller also handles any LED lighting associated with individual food lockers or food locker doors.

Upon initial implementation of embodiments of the ONDO™ Self-serve Food Locker assembly, system, and method, an administrator user profile for system access is created. The administrator oversees internal system and operational management of the ONDO™ modular food locker wall installation. The administrator adds employee users named runners with limited privileges within the web portal control of the system, and limited privileges in operating the physical ONDO™ modular food locker wall. For example, these runners unlock vacant lockers to load food. The administrator may grant runners access to unlock occupied food lockers to remove expired orders, clean the food locker internal cavity, assess the state of the food locker doors, and perform similar food locker operational maintenance activities.

Embodiments of the ONDO™ Self-serve Food Locker assembly, system, and method provide an abbreviated portal available for customers to set up their own profile. These customers will have more limited rights than runners. These customers store information such as their name, contact method, additional identification parameters, and a personal unlock code of their choice, which will be used for any order they place.

System and Method of Use

Figure 9:
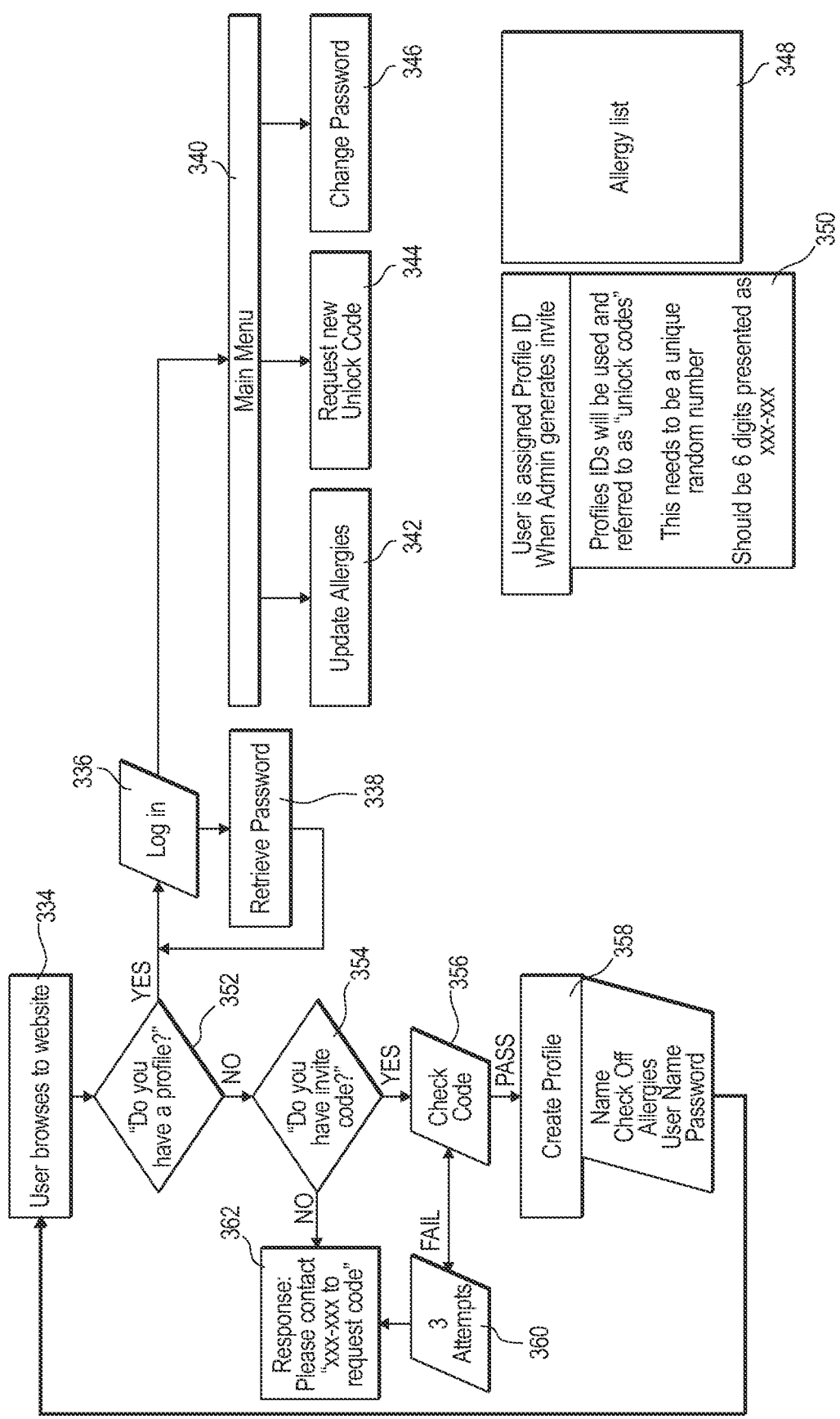
FIG. 9 is a continuation of the representative system schematic of FIG. 8.
Figure 14:
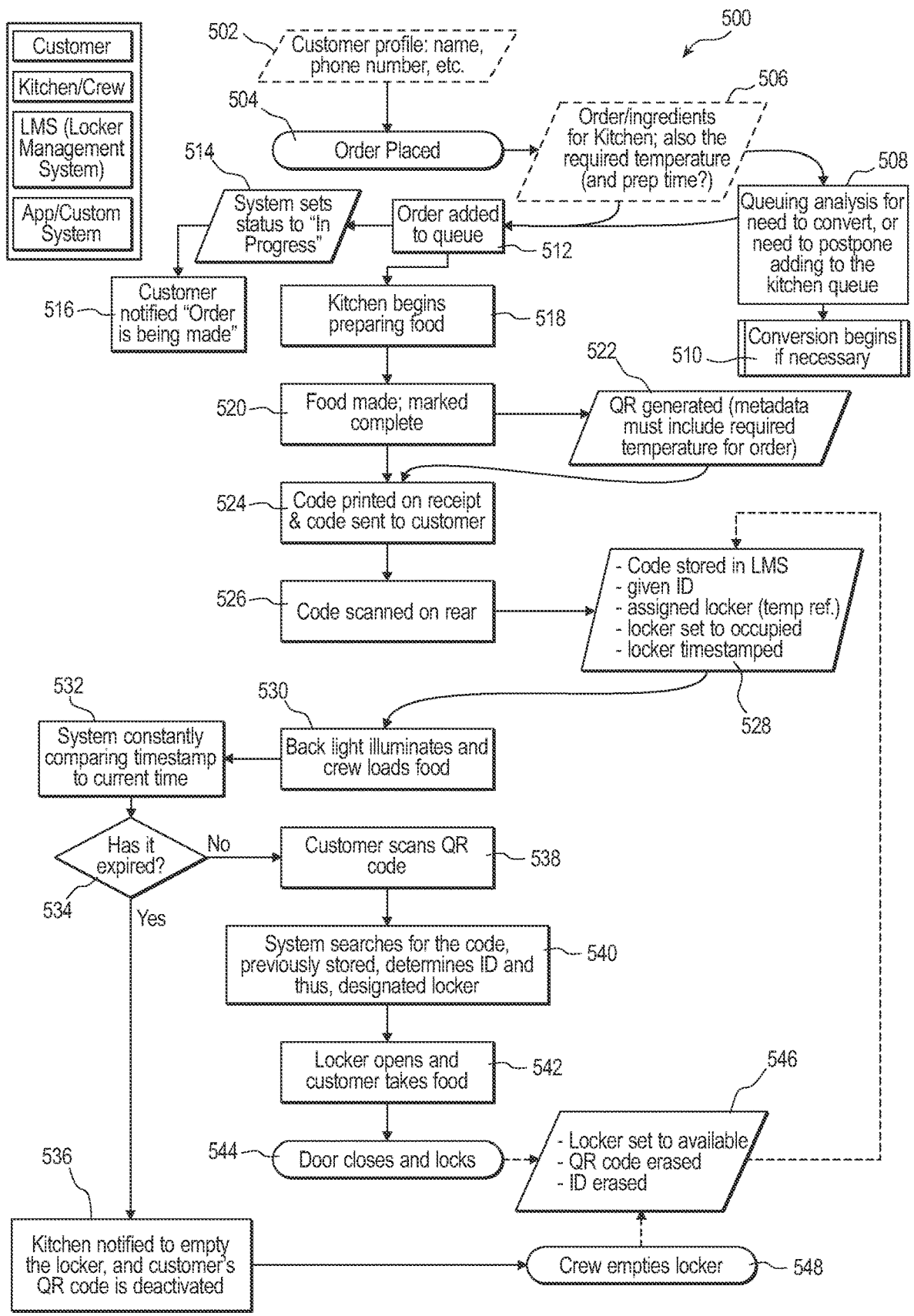
FIG. 14 is a representative method schematic 500 for an embodiment of the ONDO™ Self-serve Food Locker method.
Figure 15:
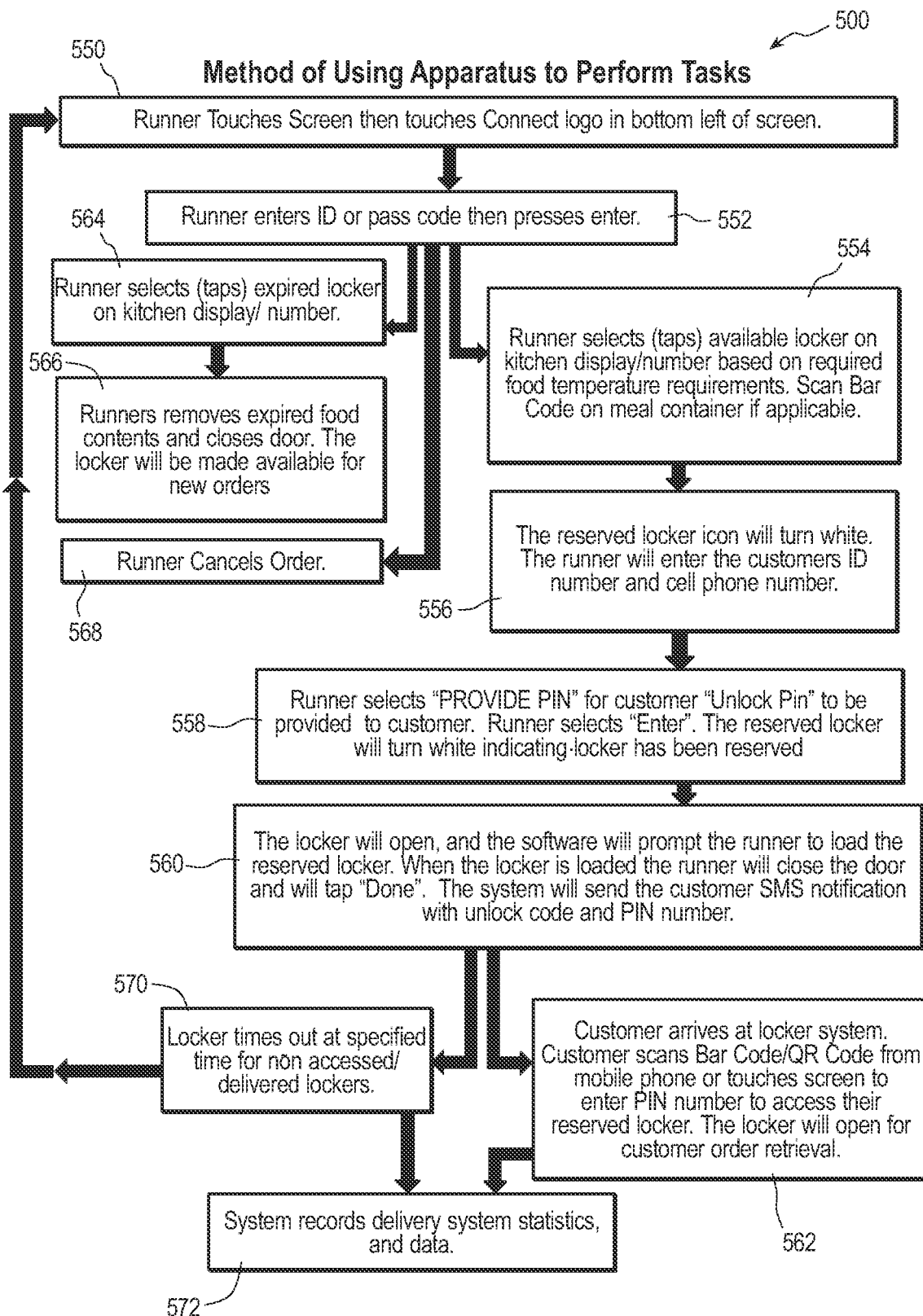
FIG. 15 is a continuation of the representative method schematic for an embodiment of the ONDO™ Self-serve Food Locker method of FIG. 14.
Figure 16A:
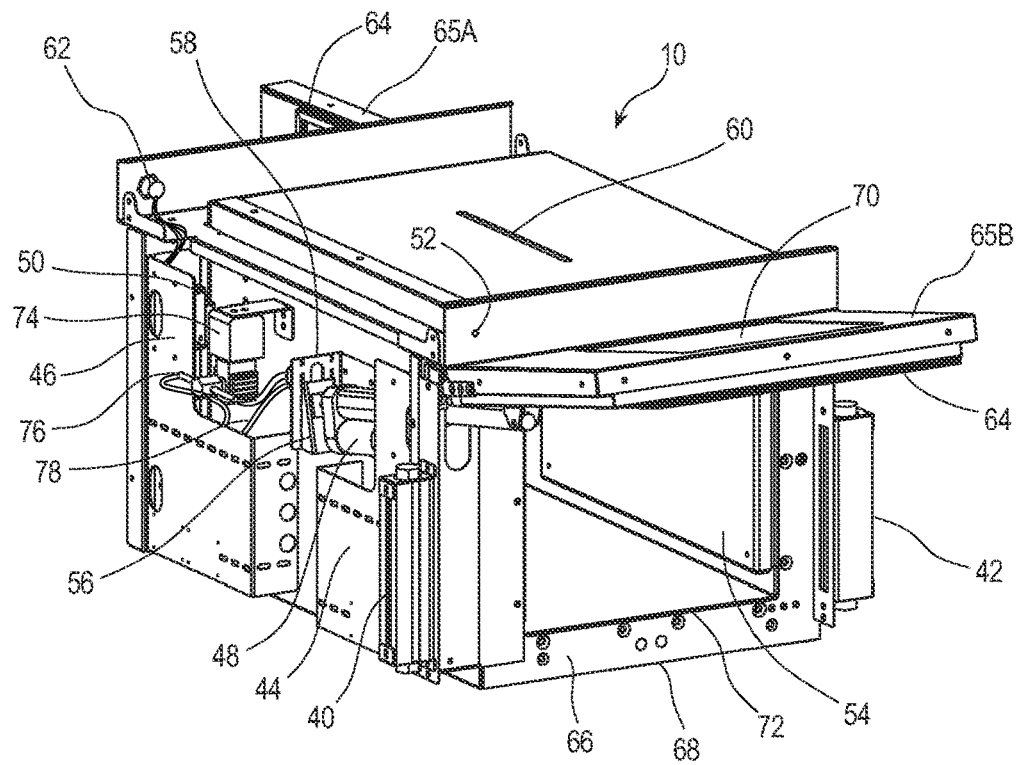
FIG. 16A is a front left top perspective view of an automatic pass-through modular food locker 10 assembly for an embodiment of the ONDO™ Self-serve Food Locker assembly, system, and method.
Figure 16B:
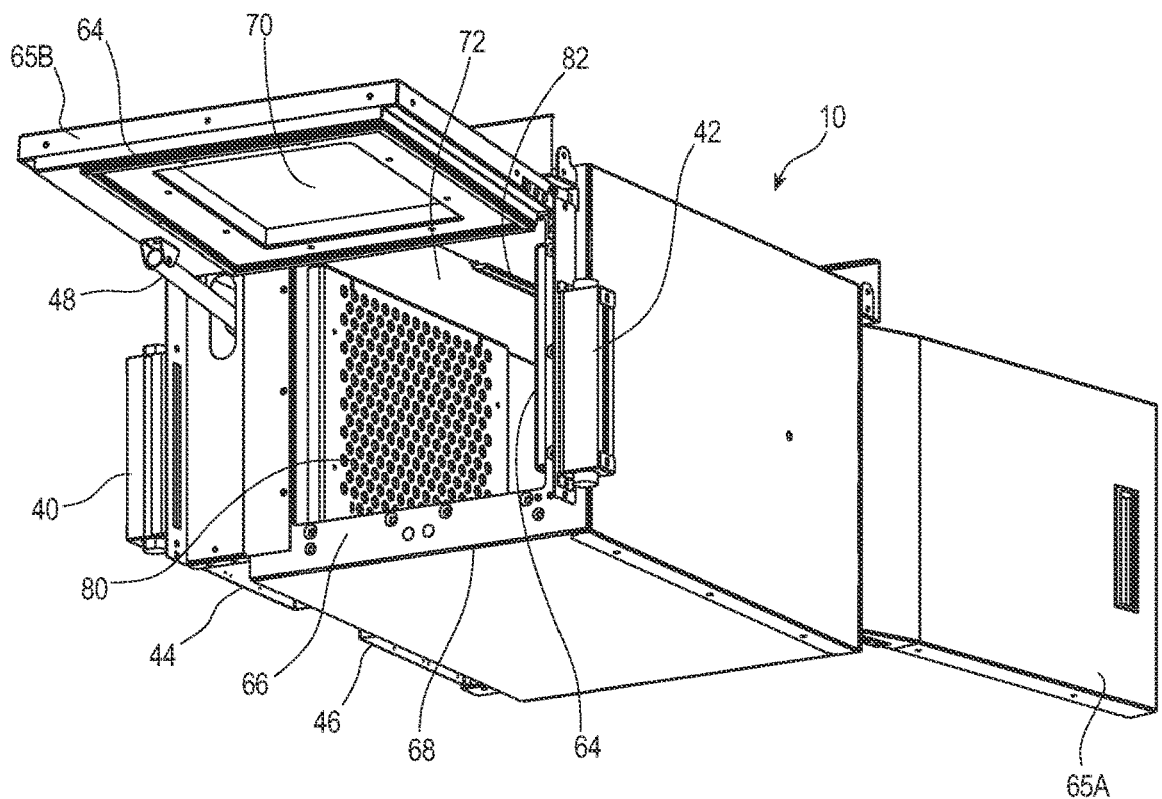
FIG. 16B is a front right bottom perspective view of the automatic pass-through modular food locker 10 of FIG. 16A.
Figure 17A:
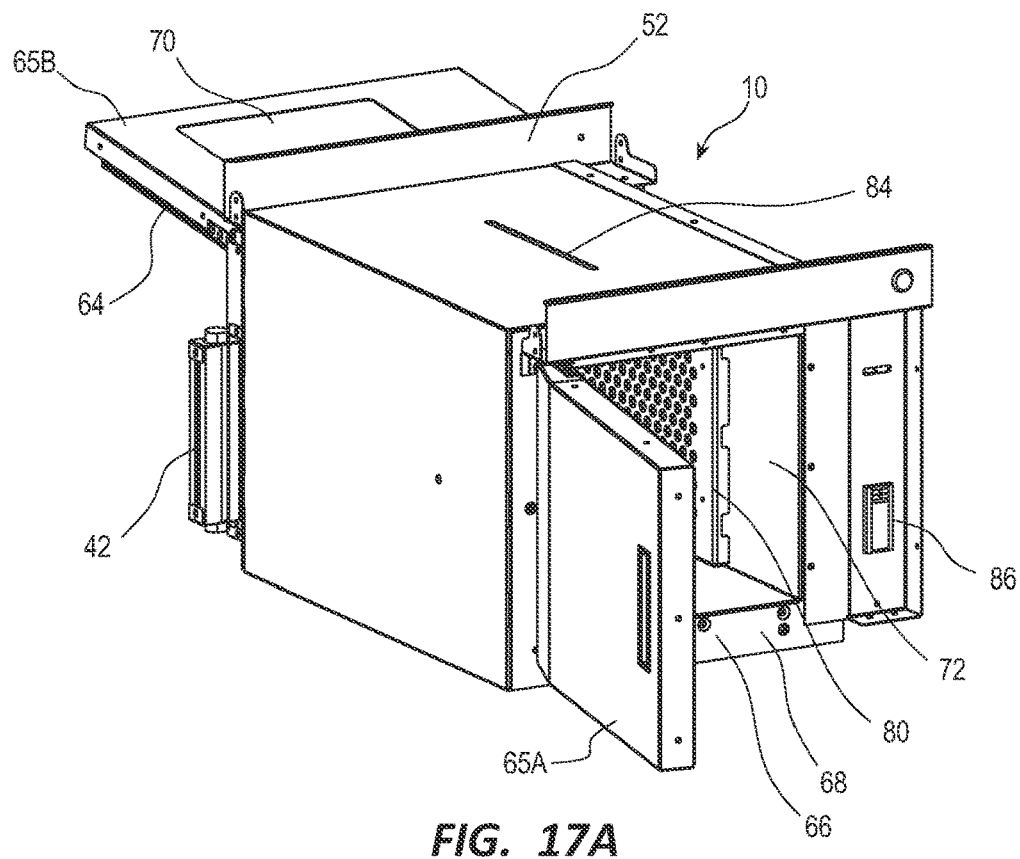
FIG. 17A is a rear left top perspective view of the automatic pass-through modular food locker 10 assembly of FIG. 16A.
Figure 17B:
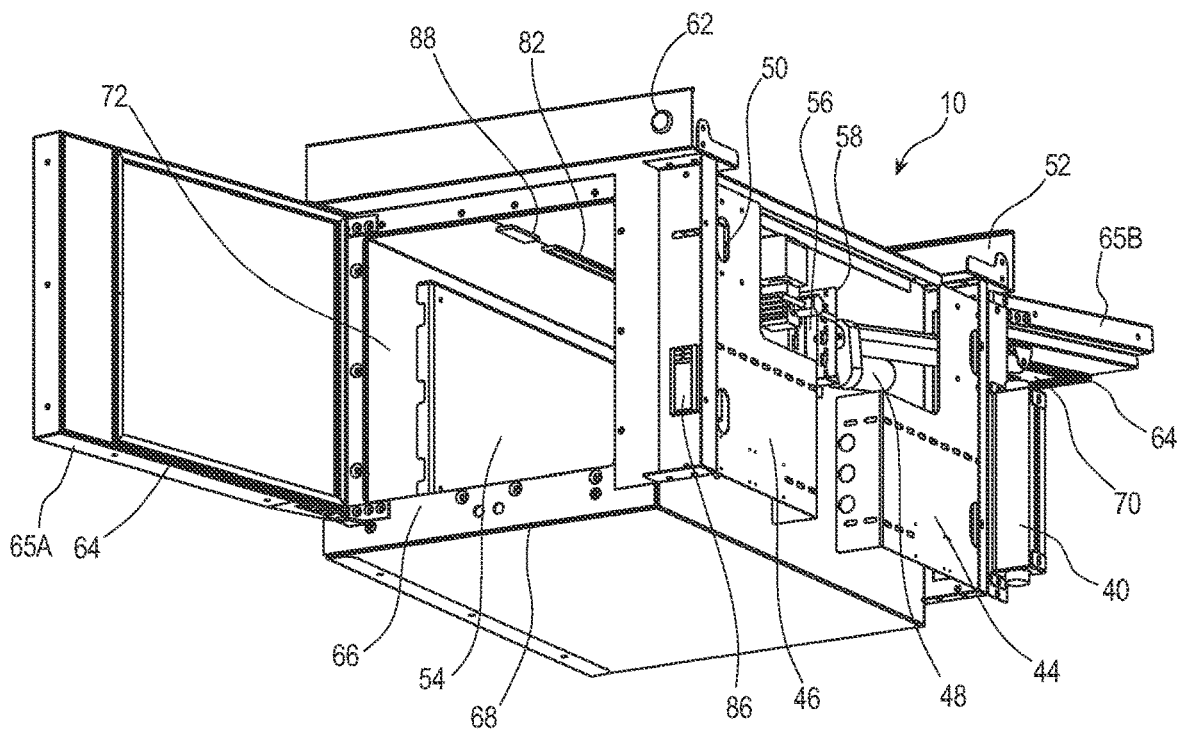
FIG. 17B is a rear right bottom perspective view of the automatic pass-through modular food locker 10 of FIG. 16A.
Figure 18:
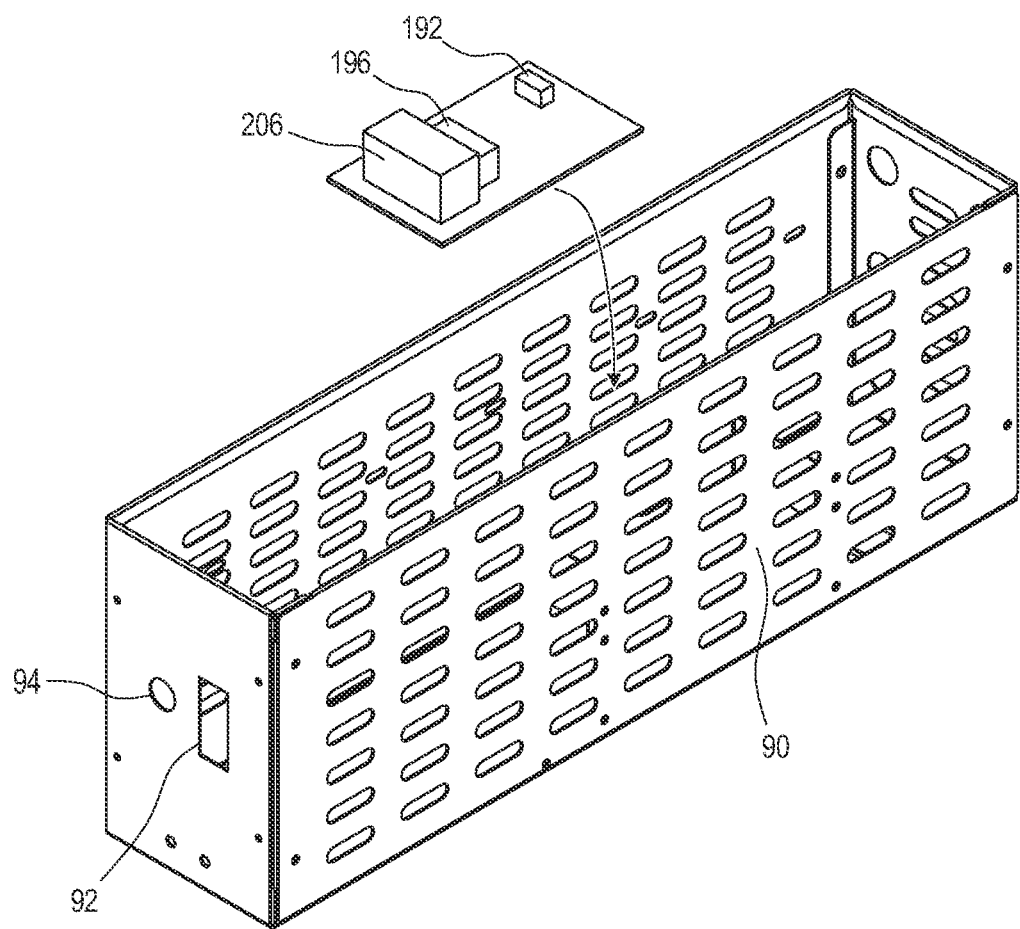
FIG. 18 is a front right top perspective view of a power drawer for an embodiment of the ONDO™ Self-serve Food Locker assembly, system, and method.

A method using a non-transitory computer-readable medium comprising executable instructions that, when executed by a processing device, cause the processing device to provide food to a customer from a self-serve food locker 10 for an embodiment of the ONDO™ Self-serve Food Locker assembly, and system, FIGS. 9, 14 and 15, performing the steps of:

A. Setting up customer identification 358, 502;
B. Inputting customer identification 336, 342, 502;
C. Placing food order into the system 504;
D. Receiving food order requirements and setting kitchen requirements 506;
E. Providing system queuing analysis for the food order 508;
F. Adding the food order into the kitchen's queue 512 and setting order status to "In Progress" 514;
G. Notifying customer that the food order is received and in queue for delivery 516;
H. Preparing the food order 518;
I. Marking the food order complete 520 and generating metadata including required system temperature for the food order 522;
J. Generating and sending a self-serve food locker access code to the customer 524;
K. Scanning the self-serve access code on rear system display screen(s) 526;
L. Storing the code in the system including customer identification, assigned self-serve food locker, temperature reference, self-serve locker occupied status, and self-serve locker time stamp 528;
M. Providing rear portal access to the self-serve food locker for loading the customer order 528;
N. Comparing time/stamp to the current time 532 and if time/stamp has expired 534;
O. Receiving a customer scanned system food locker access code from a remote customer hand-held digital device 538;
P Searching the system for the scanned code 540;

Q. Opening the designated self-serve food locker for customer to receive order 542;

R. Closing and locking the empty self-serve food locker 544;

S. Deactivating the customer's self-serve food locker access code and providing access to vendor to empty the self-serve food locker 536;

T. Erasing customer identification and accessing code from system 546;

U. Emptying the self-serve food locker 548; and

V. Setting the self-serve food locker system status to available and erasing the prior access code and customer identification erased 546.

FIG. 15 is a flow diagram illustrating a method 500 of a runner using embodiments of an ONDO™ Self-serve Food Locker assembly, system, and method of the disclosure. This method 500 may be performed by processing logic that comprises hardware (e.g., circuitry, dedicated logic, programmable logic, microcode, etc.), software (e.g., instructions run on a processing device to perform hardware simulation), or a combination thereof, and provides the operational steps for the apparatus and system.

The system generates a unique code associated to each customer's individual order. This code will be sent to the customer (via SMS, email, mobile app, etc.) upon completion of their order, FIGS. 8-13B. All the system access and control information are stored on the cloud database, and available to view on the ONDO™ web portal.

A customer places an order through any means (mobile app, 700, 702, FIGS. 19A and 19B, kiosk, FIG. 19B, at register, on website) 504, FIG. 14. Once the kitchen has prepared the order, the runner approaches the ONDO™ wall. In some capacity, the runner is identified by the system as a runner, which grants specific user privileges. This can be through facial recognition, employee badge, PIN code, etc. 552, FIG. 15. The runner profiles are created by the administrator or upon initial implementation to provide the appropriate users "runner" privileges. The system reads the user's unique code and cross-references with the database for identification of the user, along with information; specifically, their user privileges.

The system indicates which locker(s) to load with food. This can be performed the following ways: the runner scans a 2D or 3D barcode, and the system assigns a food locker based on temperature and availability, 316, FIG. 8; the runner manually indicates the temperature of each order through a user interface, FIGS. 11a, 11B, and 13, and the system assigns lockers 316, FIG. 8, based on availability and temperature of each locker; or the temperature information is embedded in the 2D or 3D code, and the system reads that information to assign lockers based on temperature and availability, 316.

Figure 10:
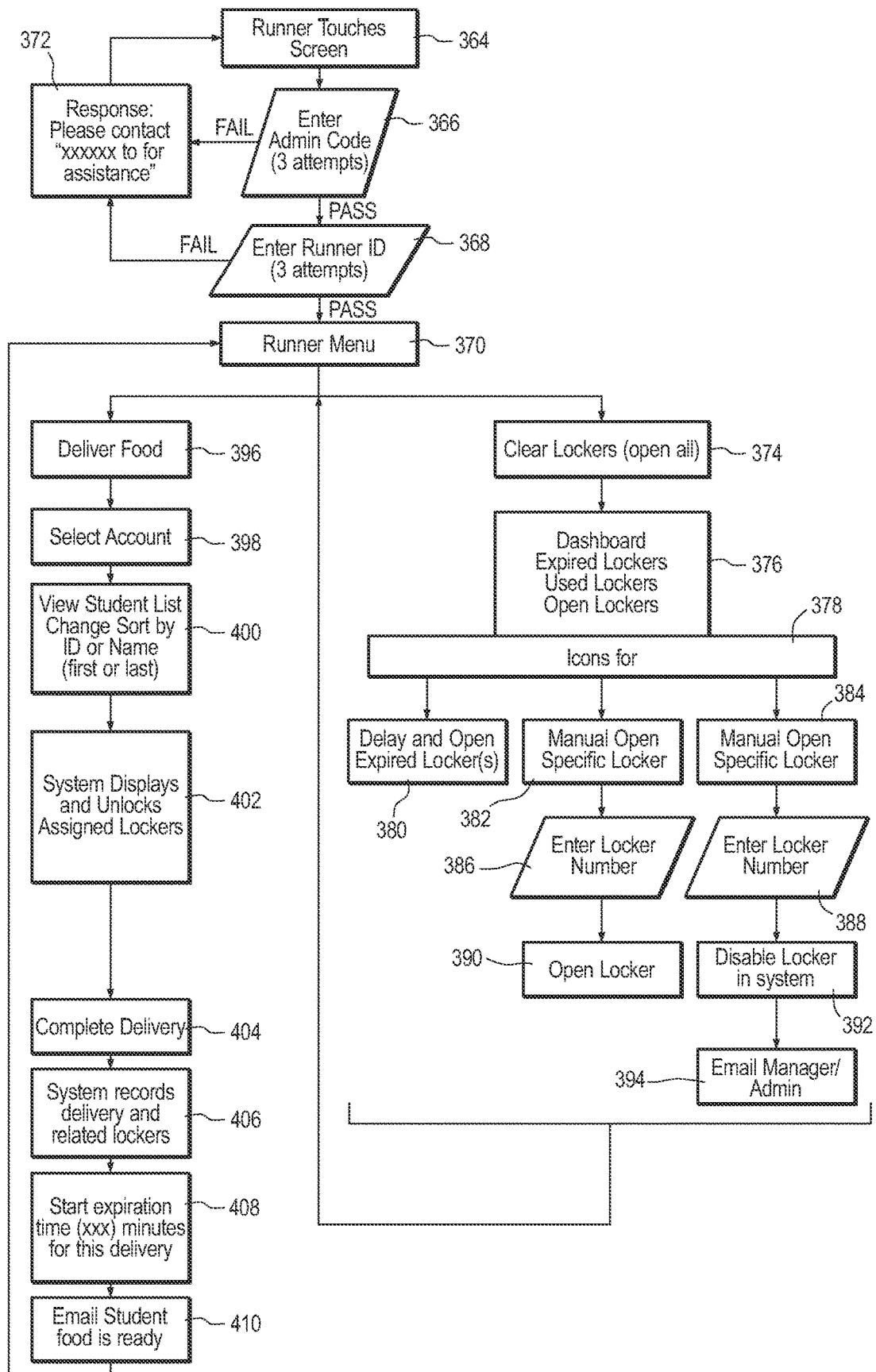
FIG. 10 is a continuation of the representative system schematic of FIG. 8.
Figure 11A:
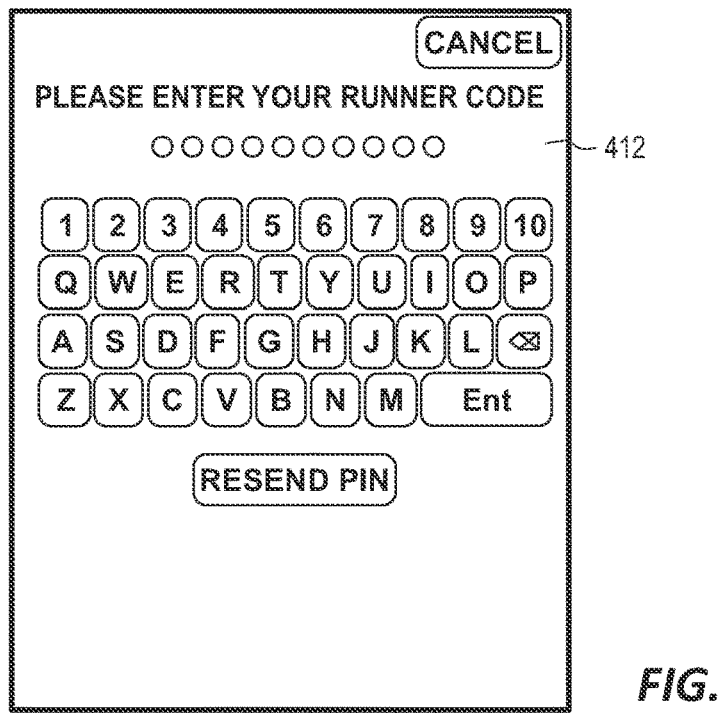
FIG. 11A is a representative interactive human-machine interface screen for runner input to the system for an embodiment of the ONDO™ Self-serve Food Locker assembly, system, and method.
Figure 11B:
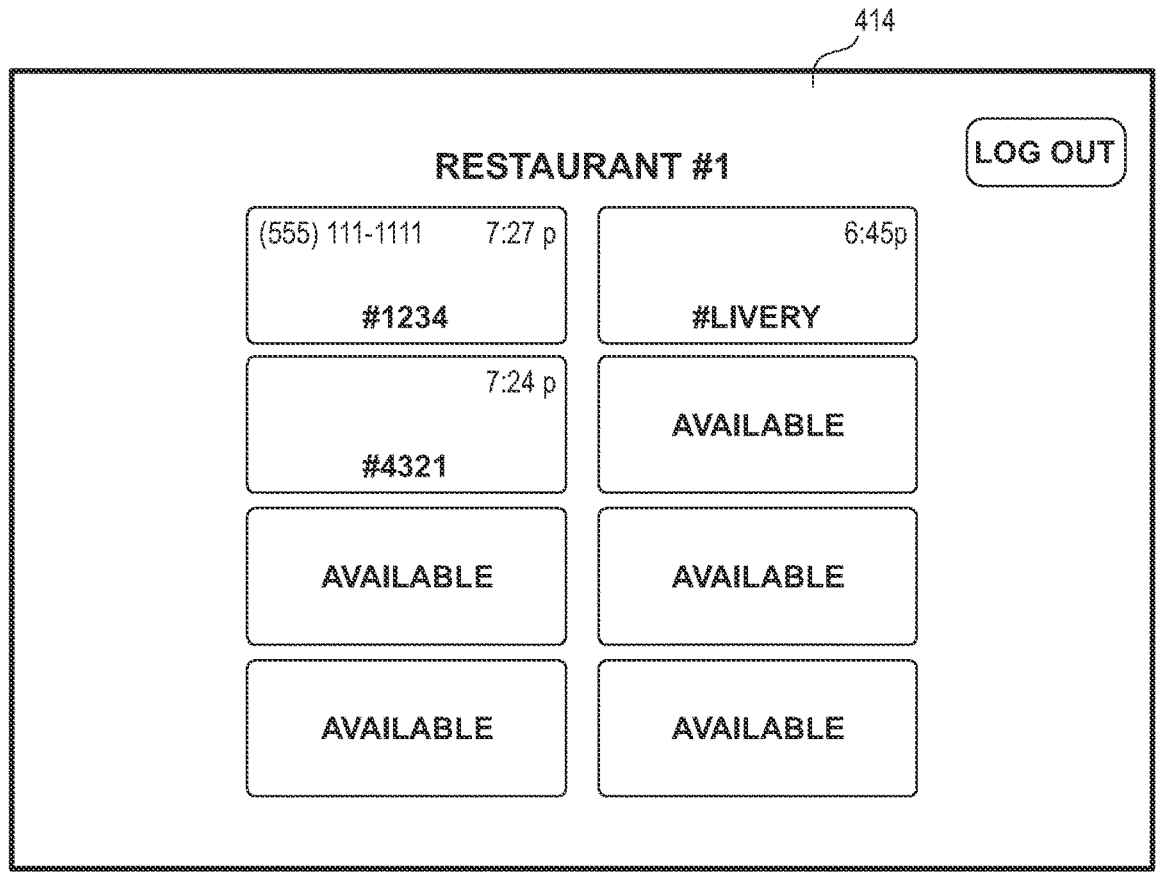
FIG. 11B is a representative interactive human-machine interface screen for runner input to the system for an embodiment of the ONDO™ Self-serve Food Locker assembly, system, and method.
Figure 12:
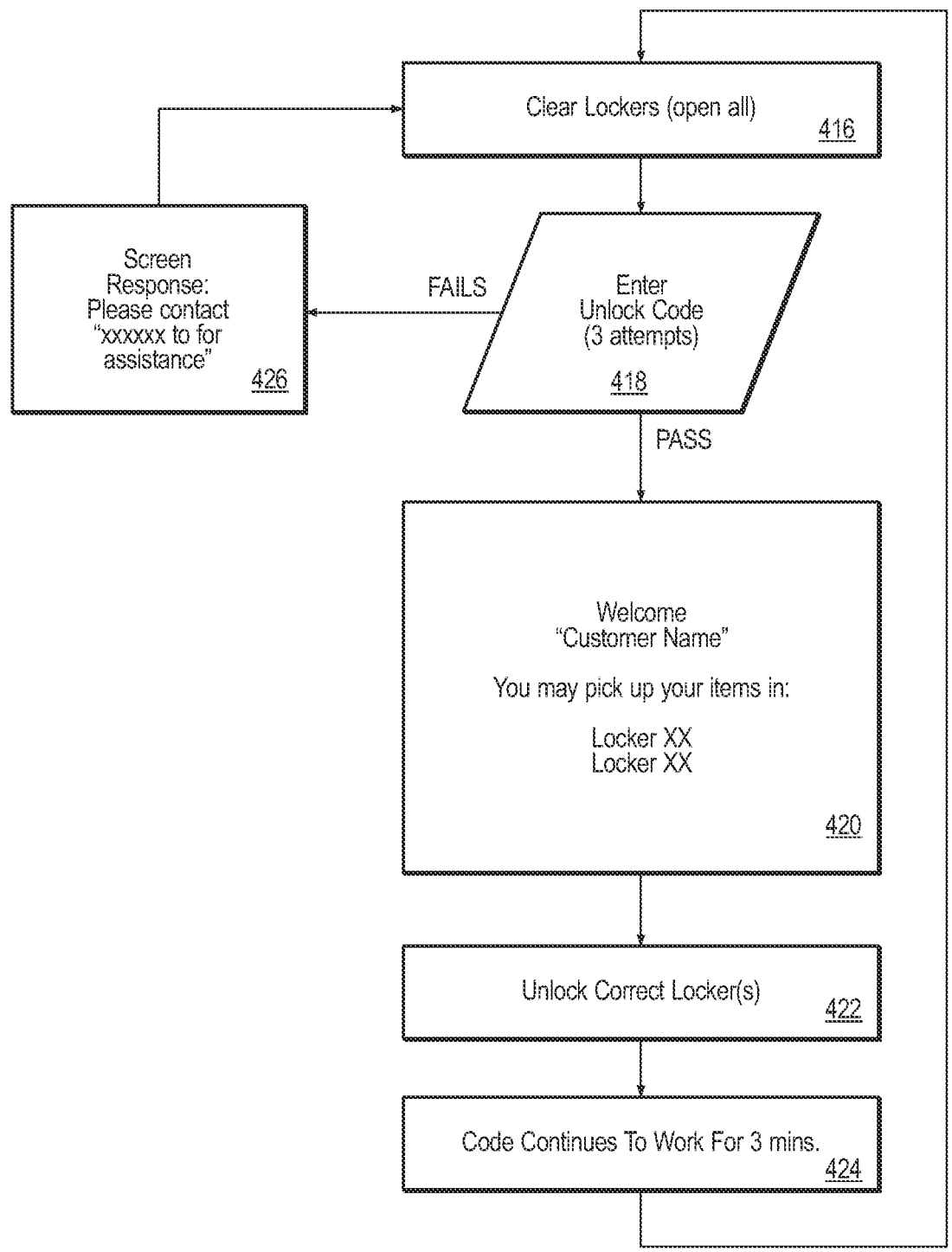
FIG. 12 is a continuation of the representative system schematic of FIG. 8.
Figure 13:
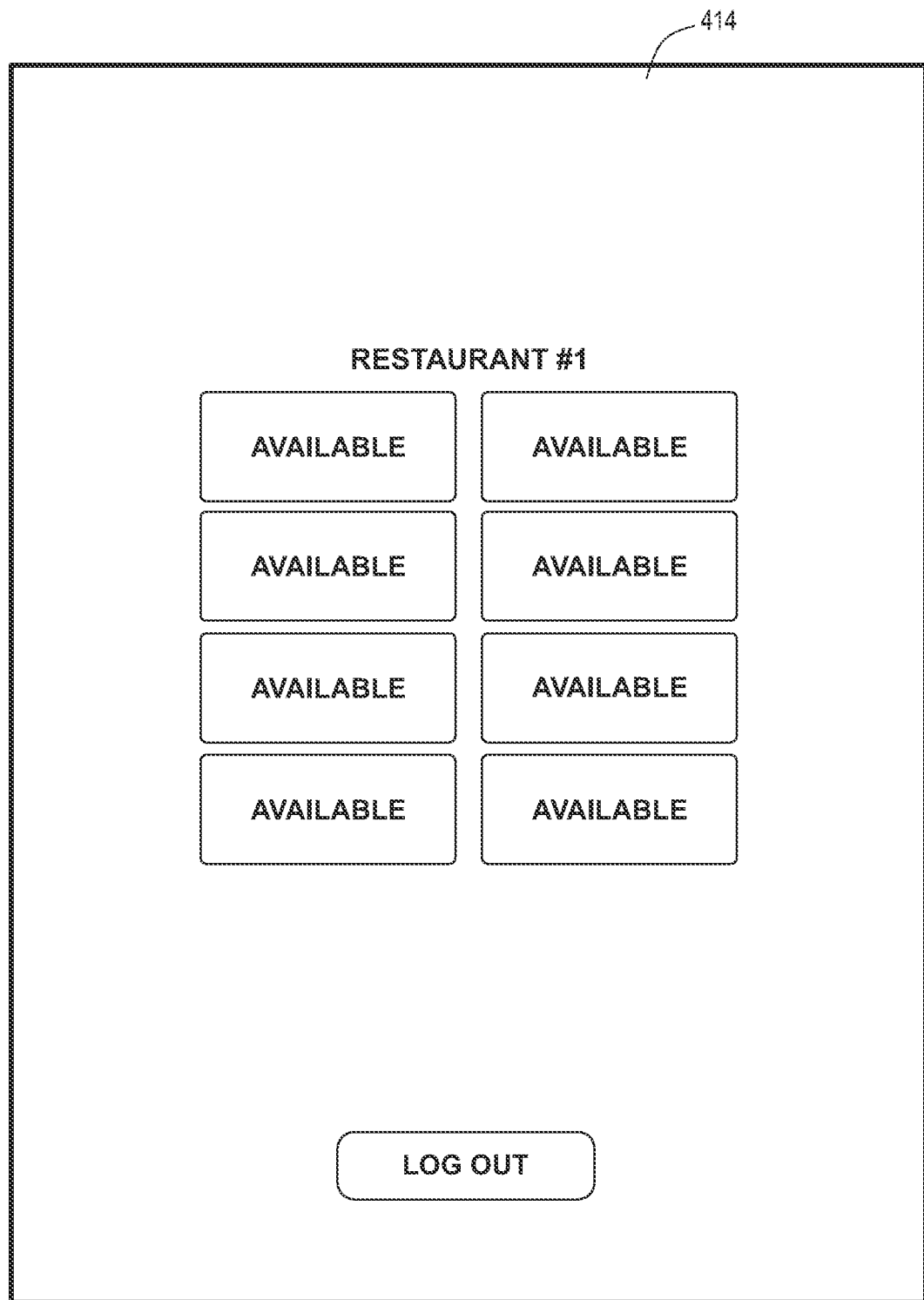
FIG. 13 is a representative interactive human-machine interface screen shot of food locker status for an embodiment of the ONDO™ Self-serve Food Locker assembly, system, and method.
Figures 19A, 19B:
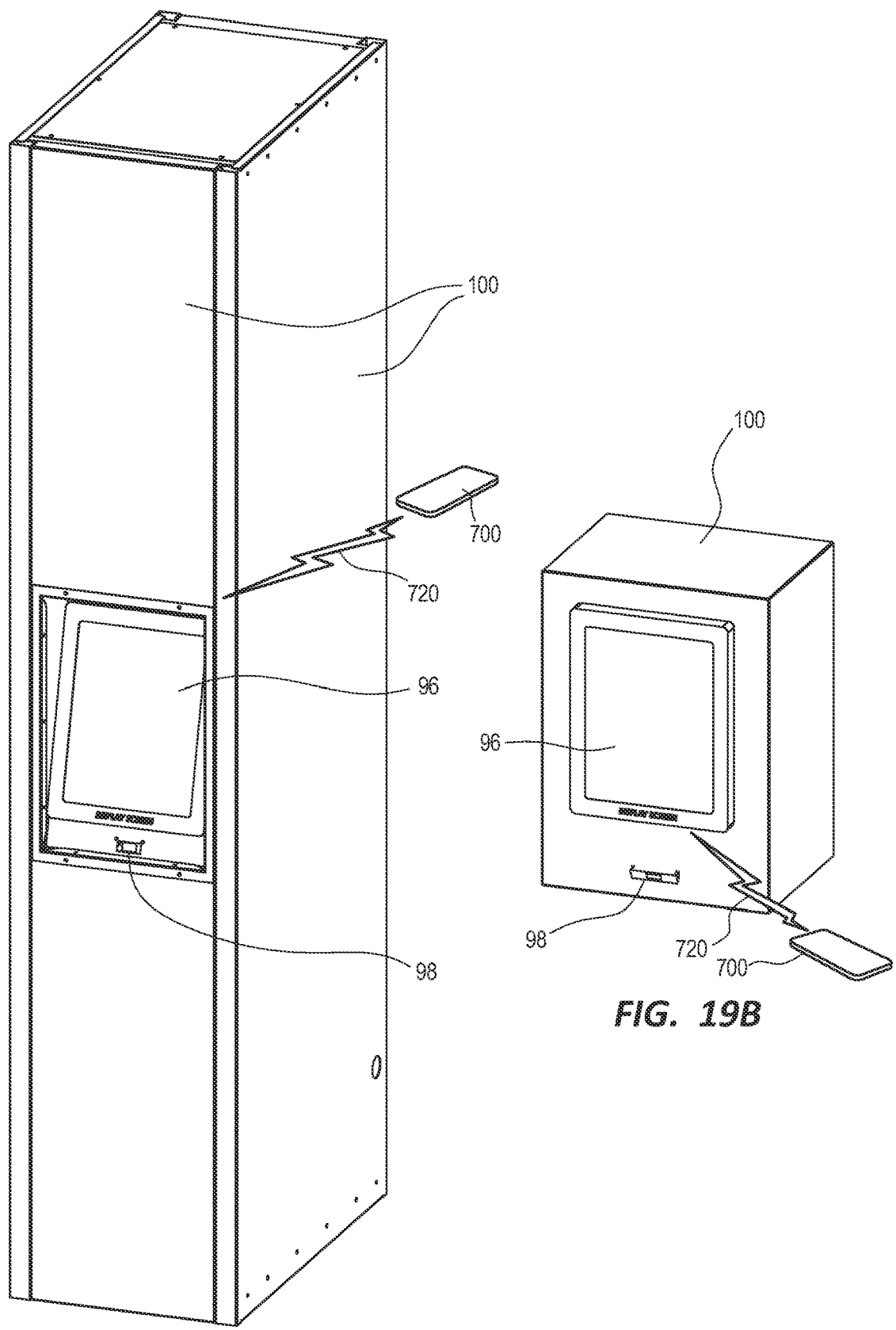
FIG. 19A is front right top perspective view of a technology tower station for an embodiment of the ONDO™ Self-serve Food Locker assembly, system, and method.
FIG. 19B is front right top perspective view of a technology remote mounted station for an embodiment of the ONDO™ Self-serve Food Locker assembly, system, and method.
Figure 20:
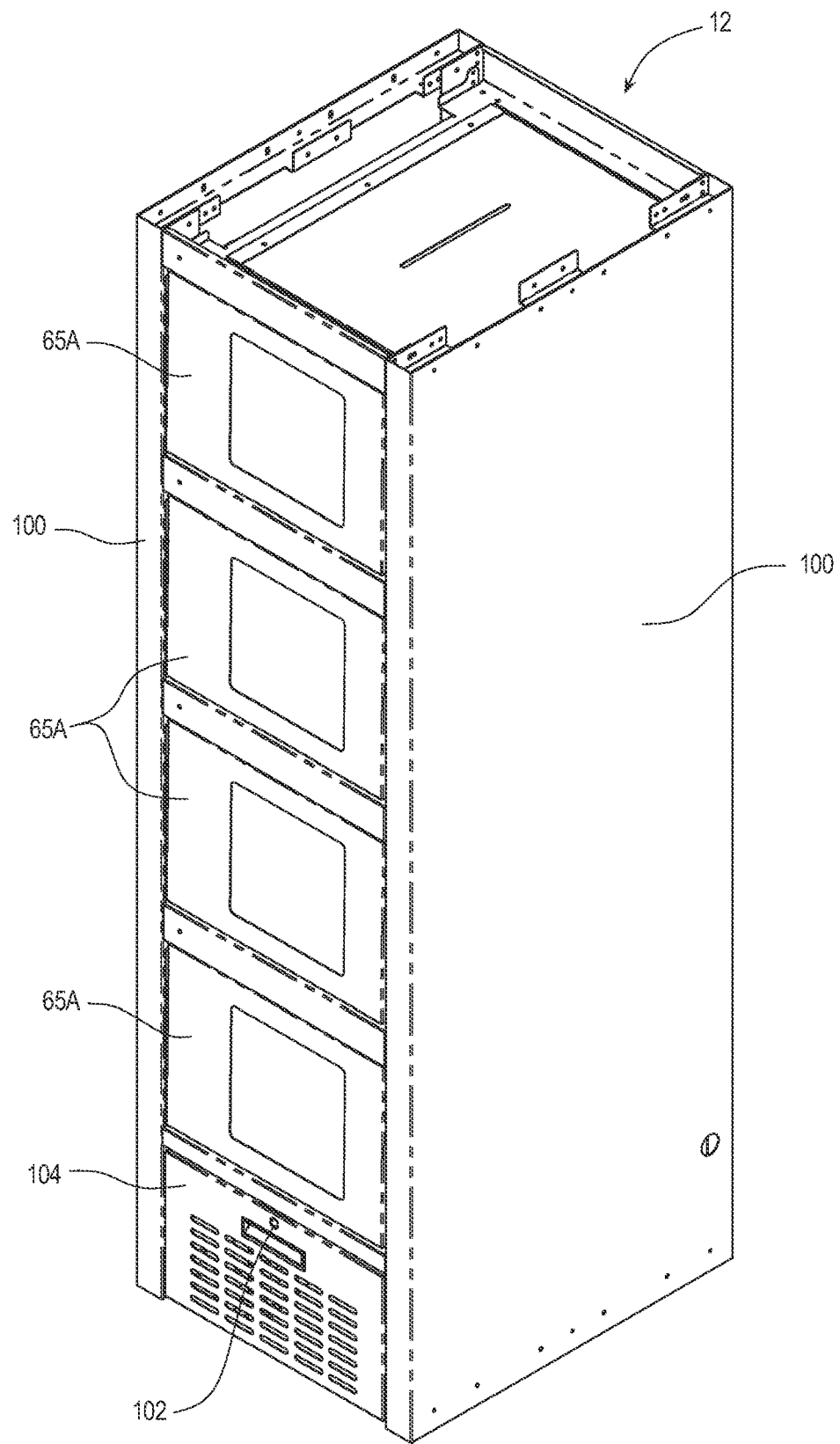
FIG. 20 is front right top perspective view of a self-contained tower with a 1×4 array of stackable, modular automatic pass-through food lockers for an embodiment of the ONDO™ Self-serve Food Locker assembly, system, and method.
Figure 21:
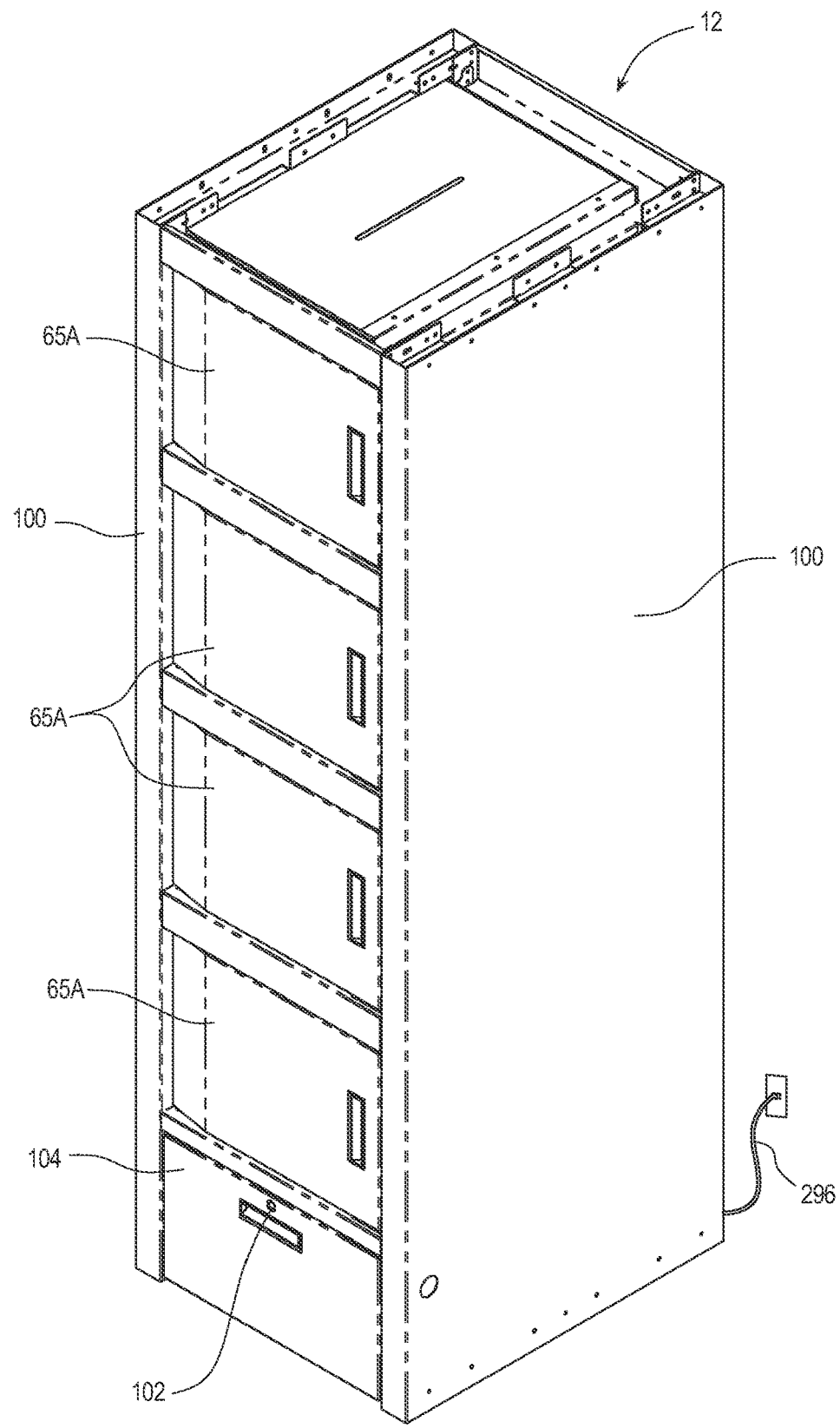
FIG. 21 is rear left top perspective view of the self-contained tower with a 1×4 array of stackable, modular automatic pass-through food lockers of FIG. 20.
Figure 22A:
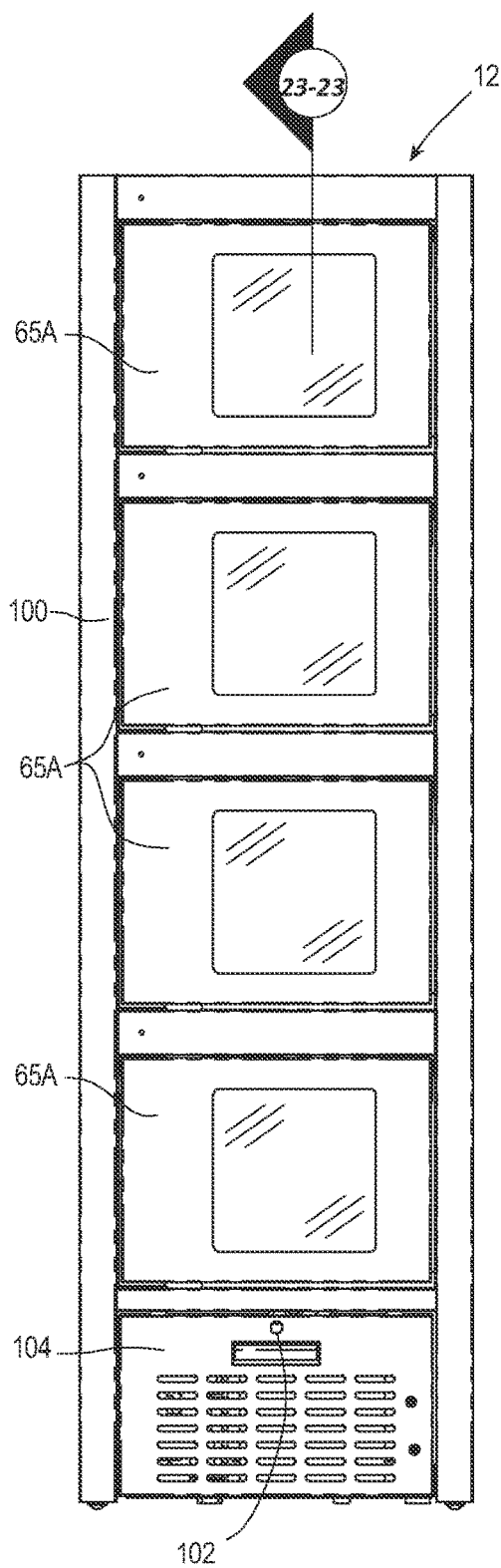
FIG. 22A is a front elevational view of the is front right top perspective view of the self-contained tower with a 1×4 array of stackable, modular automatic pass-through food lockers of FIG. 20.
Figure 22B:
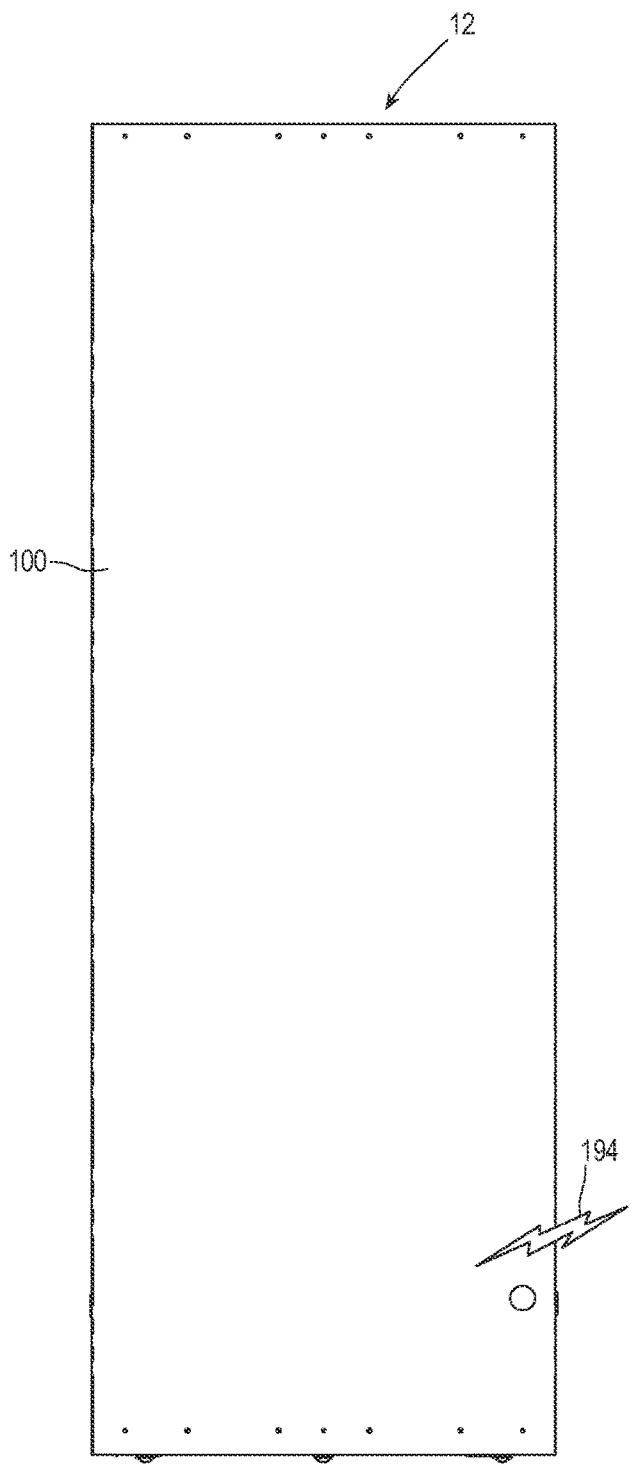
FIG. 22B is a right-side elevational view of the self-contained tower with a 1×4 array of stackable, modular automatic pass-through food lockers of FIG. 20.
Figure 23:
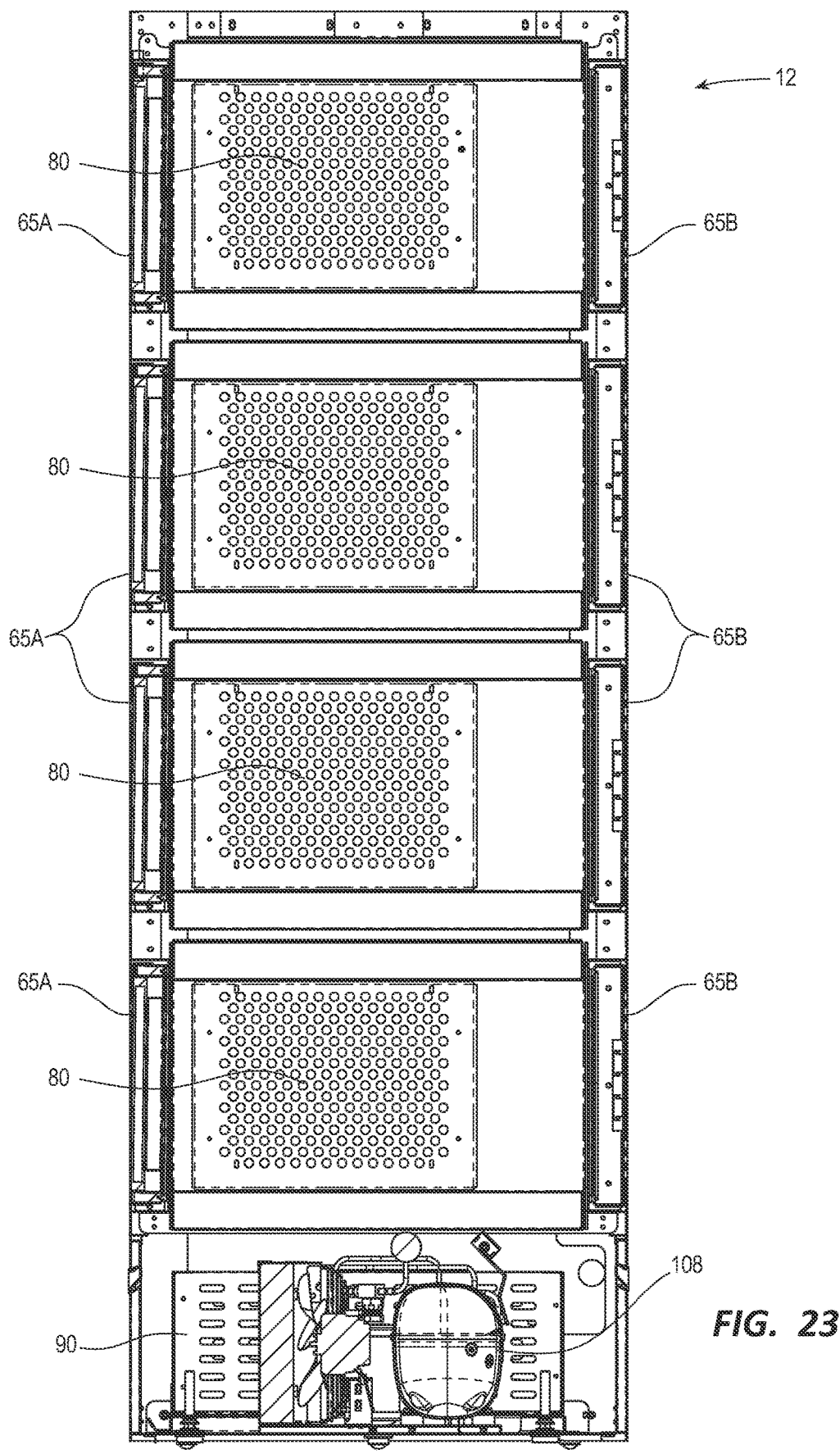
FIG. 23 is a cross-sectional sectional view of FIG.
Figure 24:
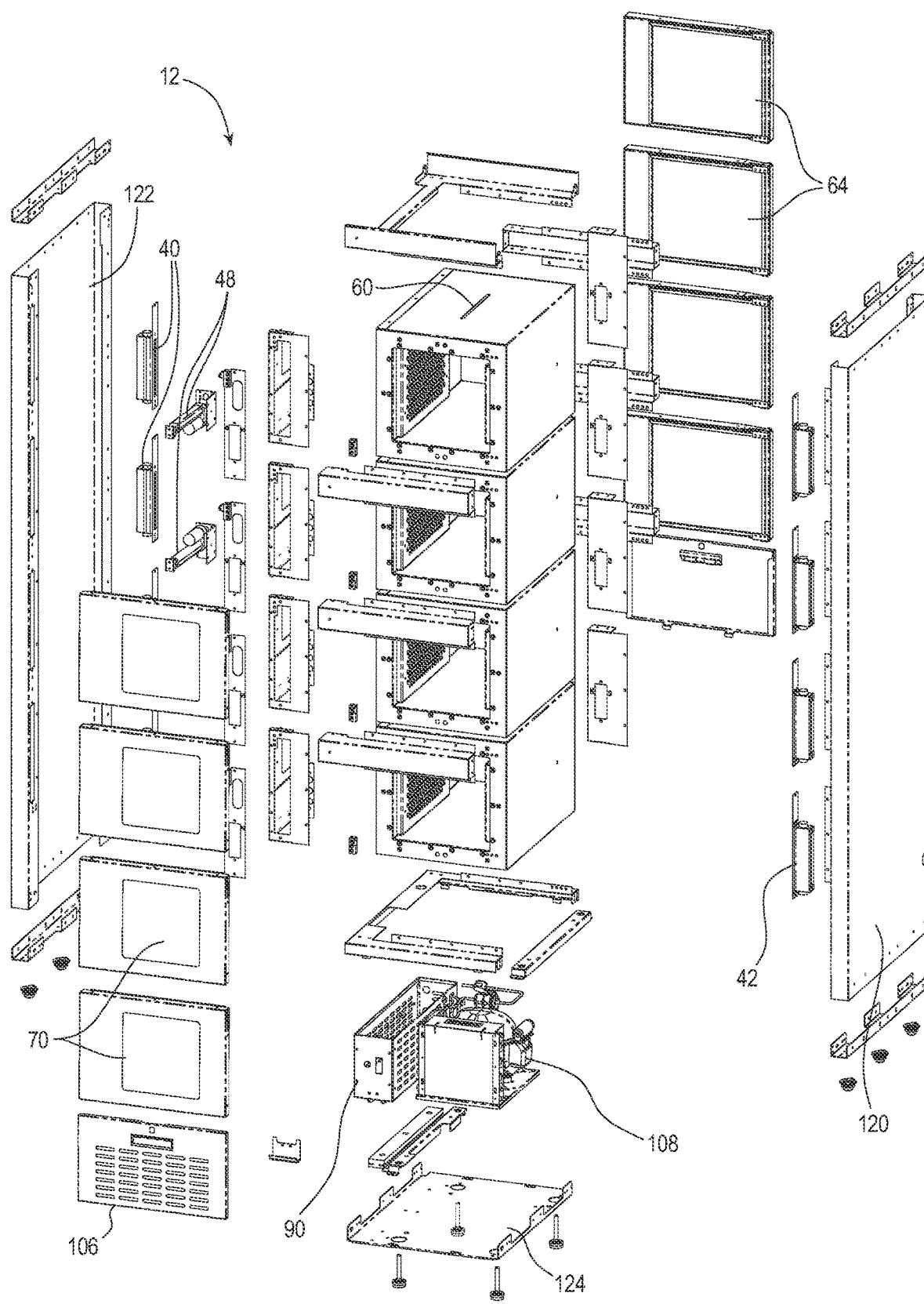
FIG. 24 is an exploded view of self-contained tower with a 1×4 array of stackable, modular automatic pass-through food lockers of FIG. 20.

The runner logs into the system using a mobile digital device 700 (wirelessly connected 720), FIGS. 19A and 19B, or stationary (touchscreen) user interface, FIG. 11A, after which the system identifies the user as a "runner" and logs them in with special user privileges, FIGS. 10 and 15. The mobile digital device or user interface provides the runner with the state of all food lockers 10 (available, occupied, hot, cold, etc.) 376, 402. Based on this system information as to locker availability, the runner is informed which food lockers 10 to load, and loads the food into the lockers 10, 404. The loaded food lockers 10 are recorded in the system 406 with the associated orders and are now deemed occupied. The runner manually indicates the temperature of each order, and the system assigns food lockers based on availability and temperature of each food locker. The runner types in a code corresponding to the order number, in which the order information is embedded. The system reads that information to assign lockers based on temperature and availability. The system automatically taps into the database to update that food locker's state.

The food locker door is closed either automatically (after a set duration following food locker door unlock, through occupancy sensor which indicates food has been loaded and the runner's hand is not in the food locker any longer or through a combination of both) or manually.

Figure 8:
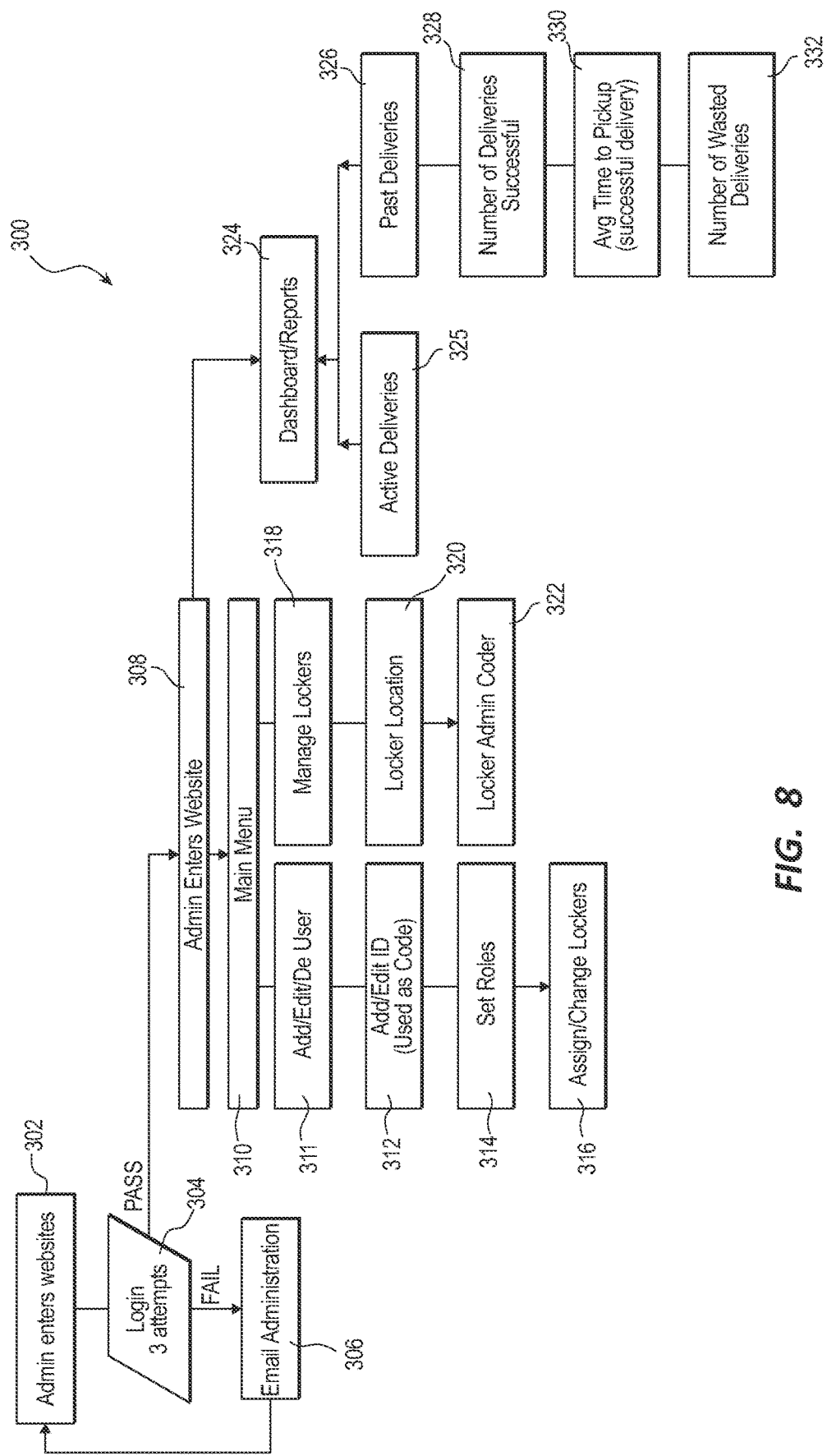
FIG. 8 is a representative schematic 300 for an embodiment of the ONDO™ Self-serve Food Locker method.

The local system synchronizes with the cloud portal and stores information upon completion of loading, FIG. 8. That information includes, but is not limited to, time/date, order number, food details (if applicable), and status of food locker.

The cloud system sends a notification to the customer through one, or a variety, of: SMS text, Email, and/or mobile application.

Included in the notification are: 2D/3D barcode pertaining to the order code, an unlock PIN, assigned food locker(s) number(s), ONDO™ modular food wall location (if the system is handling multiple locations), order information, a duration for pickup 410, 524.

Optionally, the system can generate subsequent notifications serving as reminders to the customer to pick up their order, and the time remaining before the possibility of pick-up has expired. If the food is picked up before the expiration time period step 542, the locker is set to available and any customer access codes for that locker are erased, 546. If the time has expired before the food has been picked up 534, the kitchen is notified to empty the locker and any customer codes for that locker are deactivated 536.

If the food is picked up by the customer before expiration, the customer arrives at the station and unlocks their assigned food locker(s) via the process selected by the customer namely, 2D/3D barcode, unlock PIN 538 or an unlock button on customer's mobile digital device 700.

The system reads the unlock code and cross-references with the data stored on the system microprocessor(s) and cloud-based data storage 390, 542, 560 as part of a digital processor, a memory module coupled to the digital processor and a network interface comprising wireless connectivity and coupled to the digital processor. A query is run in the local database that searches for the unique unlock code. If the unlock code is not found in the database, the user is notified that their code was invalid. If it is found in the database, the associated food locker door is unlocked. The system pulls all information regarding that order (the immediately relevant piece of information being the door identification number) 540 and signals the central relay controller to de-energize the magnetic lock for that respective food locker door for a set duration to give the customer an opportunity to approach the door and open it. The customer then retrieves their food from the identified food locker 542.

If the food is not picked up before the designated time for pick up has expired, the runner/administrator is notified of expired order(s) 536. The runner goes to the food locker assembly 12 and unlocks the food locker(s) with expired food in them and removes the food 548.

The food locker lock will remain de-energized for a set period, 380, FIG. 10. After that period of time, it will re-energize, then locking it. The unlock code remains active for a set duration after that, allowing the user to re-enter it if they missed the window of time the food locker door was unlocked.

The food locker status is then updated in the local database as "vacant/available". Every time there is a state change in any food locker, such as this, the local microprocessor controller synchronizes the food locker status change with the cloud e.g., FIG. 14, 532, 528, 546.

The food locker door is closed either automatically (after a set duration following the initial unlock; or through occupancy sensors which indicate food has been loaded and the runner's hand is not in the food locker any longer; or through a combination of both), or manually. A timer can be set to trigger a notification to the administrator if the door is left open, and to automatically close the food locker door via linear drive. The relay board signals the specific linear driver to initiate door closing. A resistance sensor is implemented to deactivate door closing upon recognizing resistance to the door (example—If somebody's hand is still in the threshold) to prevent injury or malfunction. If this occurs, the system implements a secondary duration threshold where the food locker door is reopened for a set amount of time, and then it will attempt to close again. This protective door closure override step can be repeated a set number of times until a notification error message is sent to the administrator and the web portal. The administrator can deactivate that food locker for further use until reactivated. In a deactivation period, the food is considered unavailable for loading by the system so that no orders are routed to that locker. The deactivated food locker temperature control is turned off to avoid unnecessary power consumption. The administrator's food locker deactivation rights are discretionary.

To manually close a food locker door, the administrator and runners are notified of the open food locker door so the food locker door can be manually closed. An LED light 52 will default to alarm status and blink to indicate the food locker door has been left open, FIGS. 16A-17B. An error message on the digital control screen appears with the error message "Door CNN' has been left open. Please close."

The local system microprocessor controller synchronizes with the cloud portal and stores information upon completion of removal. That information includes, but is not limited to time/date, order number, food locker details (if applicable), and/or "food locker now available."

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean the listed elements or features individually, or the recited elements or features combined with the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to include, "based at least in part on," such that an un-recited feature or element is also permissible.

Some portions of the detailed descriptions are presented in terms of algorithms and symbolic representations of operations on data bits within a computer memory. These algorithmic descriptions and representations are the means used by those skilled in the video processing arts to convey the substance of their work most effectively to others skilled in the art. An algorithm is here, and generally, conceived to be a self-consistent sequence of steps leading to a desired result. The steps are those requiring physical manipulations of physical quantities.

It should be borne in mind, however, that these and similar terms are to be associated with the appropriate physical quantities and are merely convenient labels applied to these quantities. Unless specifically stated otherwise, as apparent from the above discussion, it is appreciated that throughout the description, discussions utilizing terms such as "receiving", "providing", "transmitting", "determining", "generating", "executing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples described also relate to an apparatus for performing the methods described. This apparatus may be specially constructed for performing the methods described, or it may comprise a digital processor, a memory module coupled to the digital processor and a network interface comprising wireless connectivity and coupled to the digital processor. The apparatus and system of embodiments provide a general-purpose computer system selectively programmed by a computer program stored in the computer system. Such a computer program may be stored in a computer-readable tangible storage medium.

The methods and illustrative examples described are not inherently related to any particular computer or other apparatus. Various, general-purpose systems may be used under the teachings described, or it may prove convenient to construct more specialized apparatus to perform methods 300 and 500 and/or each of its individual functions, routines, subroutines, or operations. Examples of the structure for a variety of these systems are in the description above.

Whereas many alterations and modifications of the disclosure will become apparent to a person of ordinary skill in the art after having read the foregoing description, it is to be understood that any particular implementation shown and described by way of illustration is not intended to be considered limiting. Therefore, references to details of various implementations are not intended to limit the scope of the claims, which in themselves recite only those features regarded as the disclosure.

In the foregoing specification, embodiments of the invention have been described referring to numerous specific details that may vary from implementation to implementation. The specification and drawings are, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. An automated self-serve food locker system comprising:
  A) a plurality of integral self-serve food locker assemblies, wherein each integral self-serve food locker assembly comprises i) internal LED lighting, ii) internal ultra-violet lighting, iii) a self-serve food locker interior surface lined with 2400-degree Fahrenheit heat retardant thermal insulation, iv) at least one sensor configured to monitor an interior space of each self-serve food locker assembly; and v) at least one touchless self-serve food locker door comprising a linear drive, the touchless self-serve food locker door further comprising at least one integrated human-machine interface screen; and B) at least one remote human-machine interface station communicatively coupled to the plurality of integral food locker assemblies, the at least one remote human-machine interface station comprising a processing device comprising a non-transitory computer-readable medium comprising executable instructions that, when executed by the processing device, cause the processing device to: i) detect that a user device associated with a request for a self-serve food item is within a threshold range of the remote human-machine interface station coupled to the plurality of integral self-serve food locker assemblies, ii) identify a state of the self-serve food item with respect to the interior space of at least one integral self-serve food locker of the group of plurality of integral self-serve food locker assemblies based on a sensor of the at least integral self-serve food locker, and iii) activate the at least one integral self-serve food locker device to provide authenticated access to the interior space of at least one integral self-serve food locker based on the state of the self-serve food item.

2. The automated self-serve food locker system of claim 1, wherein the processing device further activates a user-perceivable indicator to indicate association between a self-serve food locker and a user of the user device.

3. The automated self-serve food locker system of claim 2, wherein the processing device is adapted to receive the user-perceivable identifier associated with the requested self-serve food item and to activate an indicator on at least one integral self-serve food locker assembly indicating the self-serve food item is to be placed therein.

4. The automated self-serve food locker system of claim 3, wherein the authenticated access comprises 2D/3D barcode pertaining to an order code, an unlock PIN, assigned food locker(s) number(s), a modular self-serve food locker wall location for systems handling multiple locations, self-serve food order information, and a duration for self-serve food pickup.

5. The automated self-serve food locker system of claim 4, wherein the user device comprises a hand-held digital device.

6. The automated self-serve food locker system of claim 5, wherein the state of the self-serve food item comprises at least one of:
A) a presence of the self-serve food item in the interior space of at least one integral self-serve food locker, or
B) a removal of the item from the interior space of at least one integral self-serve food locker.

7. The automated self-serve food locker system of claim 6, wherein the processing device synchronizes with a cloud portal and stores information upon completion of integral self-serve food locker loading comprising at least one of:
A) time and date of order;
B) order number;
C) self-serve food order details;
D) temperature of the self-serve food locker cavity; and
E) status of the self-serve food locker doors.

8. An automated self-serve food locker method comprising the steps:
A) providing the system of claim 7;
B) setting up a user (customer) identification;
C) inputting user (customer) identification;
D) placing a user (customer) food order into the system;
E) receiving food order requirements and setting kitchen requirements;
F) providing system queuing analysis for the food order;
G) adding the food order into the kitchen's queue and setting order status to "in Progress";
H) notifying the user that the food order is received and in queue for delivery;
I) preparing the food order;
J) marking the food order complete and generating metadata including required system temperature for the food order;
K) generating and sending a self-serve food locker access code to the user (customer);
L) scanning the self-serve food locker access code on rear system display screen(s);
M) storing the self-serve food locker access code in the system including user (customer) identification, assigned self-serve food locker, self-serve food locker temperature reference, self-serve food locker occupied status, and self-serve food locker time stamp;
N) providing rear portal access to the self-serve food locker for loading the customer order;
O) comparing time/stamp to the current time and determining time/stamp has expired (go to step T);
P) receiving a user (customer) scanned system food locker access code from a remote user (customer) customer hand-held digital device;
Q) searching the system for the scanned code;
R) opening the designated self-serve food locker for the user (customer) to receive the food order;
S) closing and locking the empty self-serve food locker;
T) deactivating the user's (customer's) self-serve food locker access code and providing vendor access to empty the self-serve food locker;
U) erasing user (customer) identification and accessing code from system;
V) emptying the self-serve food locker; and
W) setting the self-serve food locker system status to available and erasing the prior access code.

* * * * *